(12) United States Patent
Lee et al.

(10) Patent No.: US 10,819,548 B2
(45) Date of Patent: Oct. 27, 2020

(54) WIRELESS DEVICE LOW POWER WAKE UP

(71) Applicant: NEWRACOM, INC., Lake Forest, CA (US)

(72) Inventors: Dae Won Lee, Irvine, CA (US); Yujin Noh, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 16/565,301

(22) Filed: Sep. 9, 2019

(65) Prior Publication Data

US 2020/0007373 A1    Jan. 2, 2020

Related U.S. Application Data

(63) Continuation of application No. 16/134,728, filed on Sep. 18, 2018, now Pat. No. 10,454,738, which is a continuation of application No. 15/667,574, filed on Aug. 2, 2017, now Pat. No. 10,129,064.

(60) Provisional application No. 62/371,095, filed on Aug. 4, 2016, provisional application No. 62/370,145, filed on Aug. 2, 2016.

(51) Int. Cl.
*H04L 27/26* (2006.01)
*H04W 52/02* (2009.01)

(52) U.S. Cl.
CPC ...... *H04L 27/2627* (2013.01); *H04L 27/2602* (2013.01); *H04L 27/2607* (2013.01); *H04L 27/2618* (2013.01); *H04W 52/0216* (2013.01); *H04W 52/0229* (2013.01); *H04W 52/0235* (2013.01); *H04W 52/0274* (2013.01)

(58) Field of Classification Search
CPC ......... H04W 52/0229; H04W 52/0235; H04W 72/0446; H04W 16/14; H04W 16/32; H04L 27/2607; H04L 27/2618; H04L 27/2602; H04L 27/2628; H04L 27/2692
USPC ....................... 375/260, 295, 308
See application file for complete search history.

(56) References Cited

U.S. PATENT DOCUMENTS

2018/0041959 A1* 2/2018 Yang ................. H04W 52/0229
2018/0317242 A1* 11/2018 Park ................... H04W 74/0816
2019/0036754 A1* 1/2019 Lee ..................... H04L 27/2627

OTHER PUBLICATIONS

Part 11: Wireless LAN Medium Access Control (MAC) and Physical Layer (PHY) Specifications, IEEE Standards 802.11 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Emmanuel Bayard

(57) ABSTRACT

A wireless device generates a Legacy preamble, a 20 MHz Orthogonal Frequency Division Multiplexing (OFDM) symbol, and a Wake-Up (WU) signal portion. The Legacy Preamble includes a Legacy Short Training Field (L-STF), a Legacy Long Training Field (L-LTF) and a Legacy Signal (L-SIG) field. The 20 MHz OFDM symbol has a duration of 4 μs. The WU signal portion has a frequency bandwidth that is narrower than a frequency bandwidth of the Legacy preamble. The wireless device transmits a frame, which includes transmitting the Legacy preamble, transmitting the 20 MHz OFDM symbol immediately after transmitting the Legacy preamble, and transmitting the WU signal portion immediately after transmitting the 20 MHz OFDM symbol.

20 Claims, 35 Drawing Sheets

(56) References Cited

OTHER PUBLICATIONS

Part 11: Wireless LAN Medium Access Control (MAC) and Physical Layer (PHY) Specifications, Amendment 4: Enhancements for Very High Throughput for Operation in Bands below 6 GHz, IEEE Standards 802.11ac, 2013, pp. 1-395, IEEE (The Institute of Electrical and Electronic Engineers, Inc.), New York, NY, USA.
Part 11: Wireless LAN Medium Access Control (MAC) and Physical Layer (PHY) Specifications, Amendment 2: Sub 1 GHz License Exempt Operation, IEEE P802.11ah/D5.0, Mar. 2015, pp. 1-604, IEEE (The Institute of Electrical and Electronic Engineers, Inc.), New York, NY, USA.

* cited by examiner

FIG. 1
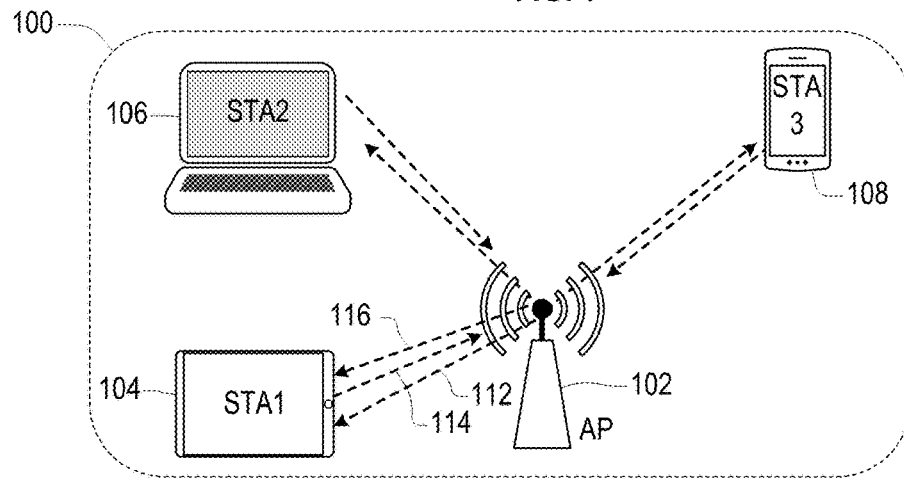
FIG. 2A
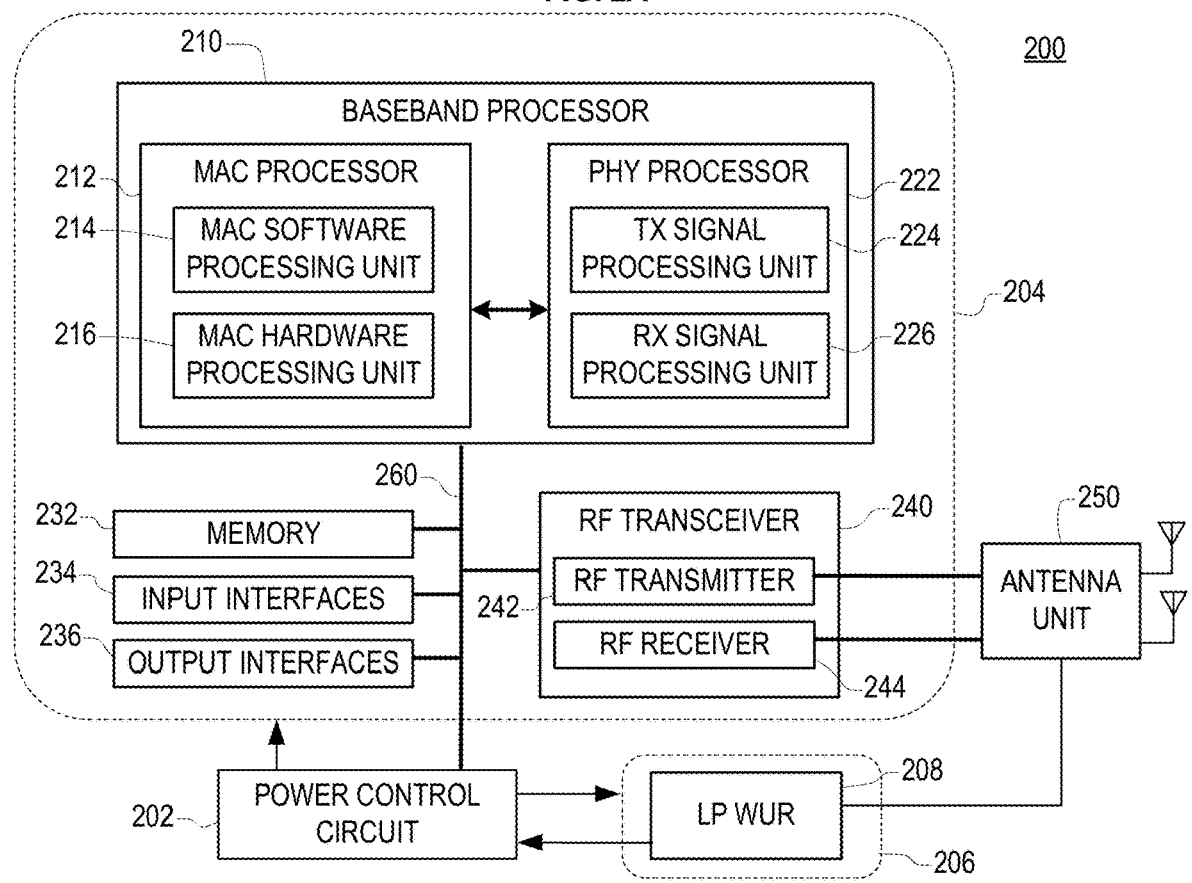
FIG. 2B
| STATE | First Power Domain 204 | Second Power Domain 206 |
|---|---|---|
| SLEEP | OFF (or Doze) | ON |
| WAKING UP | ON | ON |
| AWAKE | ON | OFF |
| PREPARING TO SLEEP | ON | ON |

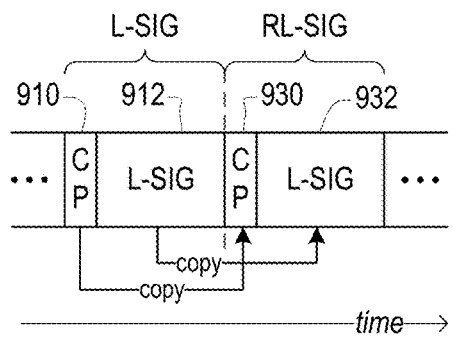
FIG. 9A
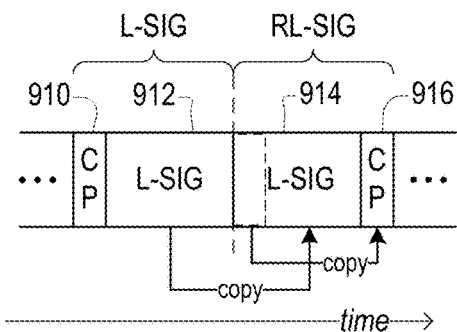
FIG. 9B
FIG. 10
1000
| Rate (4 bits) | | | | R | Length (12 bits) | | | | | | | | | | | | P | Signal Tail (6 bits) | | | | | |
|---|---|---|---|---|---|---|---|---|---|---|---|---|---|---|---|---|---|---|---|---|---|---|---|
| R1 | R2 | R3 | R4 | | LSB | | | | | | | | | | | MSB | | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
←──────────────── Transmit Order ────────────────→
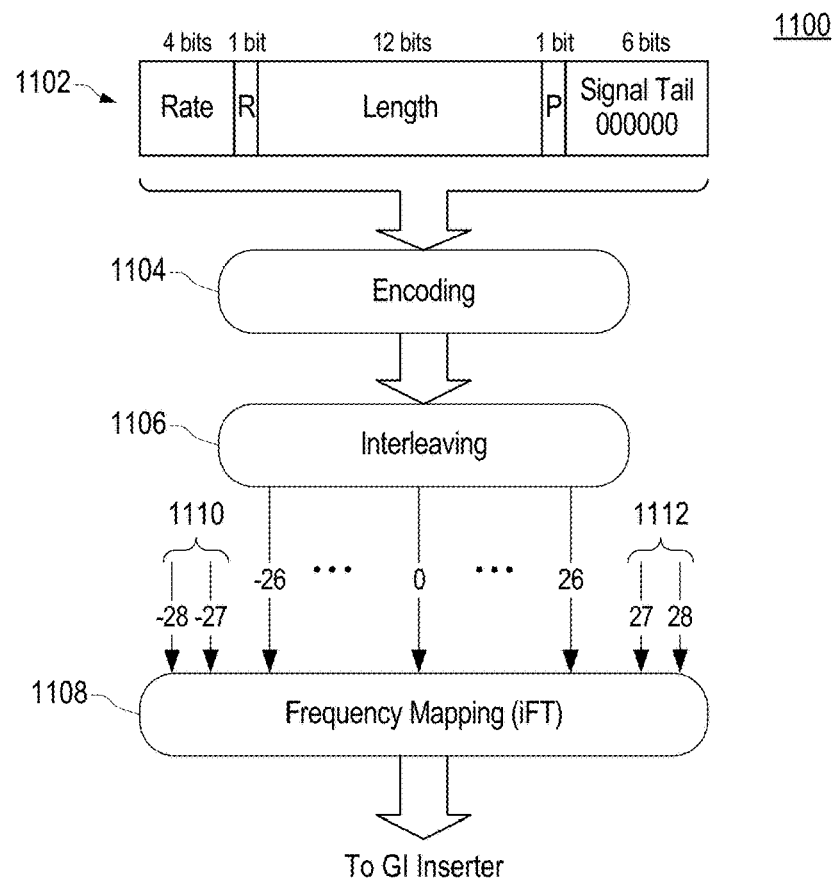
FIG. 11

FIG. 13A

Table 1, part 1

| Option# | k = -28 | k = -27 | k = 27 | k = 27 | Option# | k = -28 | k = -27 | k = 27 | k = 27 |
|---|---|---|---|---|---|---|---|---|---|
| 1 | 0 | 0 | 0 | 0 | 39 | -1 | -j | 1 | 0 |
| 2 | 1 | 0 | 0 | 0 | 40 | +j | -j | 1 | 0 |
| 3 | -j | 0 | 0 | 0 | 41 | 0 | -1 | 1 | 0 |
| 4 | -1 | 0 | 0 | 0 | 42 | 1 | -1 | 1 | 0 |
| 5 | +j | 0 | 0 | 0 | 43 | -j | -1 | 1 | 0 |
| 6 | 0 | 1 | 0 | 0 | 44 | -1 | -1 | 1 | 0 |
| 7 | 1 | 1 | 0 | 0 | 45 | +j | -1 | 1 | 0 |
| 8 | -j | 1 | 0 | 0 | 46 | 0 | +j | 1 | 0 |
| 9 | -1 | 1 | 0 | 0 | 47 | 1 | +j | 1 | 0 |
| 10 | +j | 1 | 0 | 0 | 48 | -j | +j | 1 | 0 |
| 11 | 0 | -j | 0 | 0 | 49 | -1 | +j | 1 | 0 |
| 12 | 1 | -j | 0 | 0 | 50 | +j | +j | 1 | 0 |
| 13 | -j | -j | 0 | 0 | 51 | 0 | 0 | -j | 0 |
| 14 | -1 | -j | 0 | 0 | 52 | 1 | 0 | -j | 0 |
| 15 | +j | -j | 0 | 0 | 53 | -j | 0 | -j | 0 |
| 16 | 0 | -1 | 0 | 0 | 54 | -1 | 0 | -j | 0 |
| 17 | 1 | -1 | 0 | 0 | 55 | +j | 0 | -j | 0 |
| 18 | -j | -1 | 0 | 0 | 56 | 0 | 1 | -j | 0 |
| 19 | -1 | -1 | 0 | 0 | 57 | 1 | 1 | -j | 0 |
| 20 | +j | -1 | 0 | 0 | 58 | -j | 1 | -j | 0 |
| 21 | 0 | +j | 0 | 0 | 59 | -1 | 1 | -j | 0 |
| 22 | 1 | +j | 0 | 0 | 60 | +j | 1 | -j | 0 |
| 23 | -j | +j | 0 | 0 | 61 | 0 | -j | -j | 0 |
| 24 | -1 | +j | 0 | 0 | 62 | 1 | -j | -j | 0 |
| 25 | +j | +j | 0 | 0 | 63 | -j | -j | -j | 0 |
| 26 | 0 | 0 | 1 | 0 | 64 | -1 | -j | -j | 0 |
| 27 | 1 | 0 | 1 | 0 | 65 | +j | -j | -j | 0 |
| 28 | -j | 0 | 1 | 0 | 66 | 0 | -1 | -j | 0 |
| 29 | -1 | 0 | 1 | 0 | 67 | 1 | -1 | -j | 0 |
| 30 | +j | 0 | 1 | 0 | 68 | -j | -1 | -j | 0 |
| 31 | 0 | 1 | 1 | 0 | 69 | -1 | -1 | -j | 0 |
| 32 | 1 | 1 | 1 | 0 | 70 | +j | -1 | -j | 0 |
| 33 | -j | 1 | 1 | 0 | 71 | 0 | +j | -j | 0 |
| 34 | -1 | 1 | 1 | 0 | 72 | 1 | +j | -j | 0 |
| 35 | +j | 1 | 1 | 0 | 73 | -j | +j | -j | 0 |
| 36 | 0 | -j | 1 | 0 | 74 | -1 | +j | -j | 0 |
| 37 | 1 | -j | 1 | 0 | 75 | +j | +j | -j | 0 |
| 38 | -j | -j | 1 | 0 | 76 | 0 | 0 | -1 | 0 |

FIG. 13B

Table 1, part 2

| Option# | k = -28 | k = -27 | k = 27 | k = 27 | Option# | k = -28 | k = -27 | k = 27 | k = 27 |
|---|---|---|---|---|---|---|---|---|---|
| 77 | 1 | 0 | -1 | 0 | 115 | +j | -j | +j | 0 |
| 78 | -j | 0 | -1 | 0 | 116 | 0 | -1 | +j | 0 |
| 79 | -1 | 0 | -1 | 0 | 117 | 1 | -1 | +j | 0 |
| 80 | +j | 0 | -1 | 0 | 118 | -j | -1 | +j | 0 |
| 81 | 0 | 1 | -1 | 0 | 119 | -1 | -1 | +j | 0 |
| 82 | 1 | 1 | -1 | 0 | 120 | +j | -1 | +j | 0 |
| 83 | -j | 1 | -1 | 0 | 121 | 0 | +j | +j | 0 |
| 84 | -1 | 1 | -1 | 0 | 122 | 1 | +j | +j | 0 |
| 85 | +j | 1 | -1 | 0 | 123 | -j | +j | +j | 0 |
| 86 | 0 | -j | -1 | 0 | 124 | -1 | +j | +j | 0 |
| 87 | 1 | -j | -1 | 0 | 125 | +j | +j | +j | 0 |
| 88 | -j | -j | -1 | 0 | 126 | 0 | 0 | 0 | 1 |
| 89 | -1 | -j | -1 | 0 | 127 | 1 | 0 | 0 | 1 |
| 90 | +j | -j | -1 | 0 | 128 | -j | 0 | 0 | 1 |
| 91 | 0 | -1 | -1 | 0 | 129 | -1 | 0 | 0 | 1 |
| 92 | 1 | -1 | -1 | 0 | 130 | +j | 0 | 0 | 1 |
| 93 | -j | -1 | -1 | 0 | 131 | 0 | 1 | 0 | 1 |
| 94 | -1 | -1 | -1 | 0 | 132 | 1 | 1 | 0 | 1 |
| 95 | +j | -1 | -1 | 0 | 133 | -j | 1 | 0 | 1 |
| 96 | 0 | +j | -1 | 0 | 134 | -1 | 1 | 0 | 1 |
| 97 | 1 | +j | -1 | 0 | 135 | +j | 1 | 0 | 1 |
| 98 | -j | +j | -1 | 0 | 136 | 0 | -j | 0 | 1 |
| 99 | -1 | +j | -1 | 0 | 137 | 1 | -j | 0 | 1 |
| 100 | +j | +j | -1 | 0 | 138 | -j | -j | 0 | 1 |
| 101 | 0 | 0 | +j | 0 | 139 | -1 | -j | 0 | 1 |
| 102 | 1 | 0 | +j | 0 | 140 | +j | -j | 0 | 1 |
| 103 | -j | 0 | +j | 0 | 141 | 0 | -1 | 0 | 1 |
| 104 | -1 | 0 | +j | 0 | 142 | 1 | -1 | 0 | 1 |
| 105 | +j | 0 | +j | 0 | 143 | -j | -1 | 0 | 1 |
| 106 | 0 | 1 | +j | 0 | 144 | -1 | -1 | 0 | 1 |
| 107 | 1 | 1 | +j | 0 | 145 | +j | -1 | 0 | 1 |
| 108 | -j | 1 | +j | 0 | 146 | 0 | +j | 0 | 1 |
| 109 | -1 | 1 | +j | 0 | 147 | 1 | +j | 0 | 1 |
| 110 | +j | 1 | +j | 0 | 148 | -j | +j | 0 | 1 |
| 111 | 0 | -j | +j | 0 | 149 | -1 | +j | 0 | 1 |
| 112 | 1 | -j | +j | 0 | 150 | +j | +j | 0 | 1 |
| 113 | -j | -j | +j | 0 | 151 | 0 | 0 | 1 | 1 |
| 114 | -1 | -j | +j | 0 | 152 | 1 | 0 | 1 | 1 |

FIG. 13C
Table 1, part 3

| Option# | k = -28 | k= -27 | k = 27 | k = 27 | Option# | k = -28 | k= -27 | k = 27 | k = 27 |
|---|---|---|---|---|---|---|---|---|---|
| 153 | -j | 0 | 1 | 1 | 191 | 0 | -1 | -j | 1 |
| 154 | -1 | 0 | 1 | 1 | 192 | 1 | -1 | -j | 1 |
| 155 | +j | 0 | 1 | 1 | 193 | -j | -1 | -j | 1 |
| 156 | 0 | 1 | 1 | 1 | 194 | -1 | -1 | -j | 1 |
| 157 | 1 | 1 | 1 | 1 | 195 | +j | -1 | -j | 1 |
| 158 | -j | 1 | 1 | 1 | 196 | 0 | +j | -j | 1 |
| 159 | -1 | 1 | 1 | 1 | 197 | 1 | +j | -j | 1 |
| 160 | +j | 1 | 1 | 1 | 198 | -j | +j | -j | 1 |
| 161 | 0 | -j | 1 | 1 | 199 | -1 | +j | -j | 1 |
| 162 | 1 | -j | 1 | 1 | 200 | +j | +j | -j | 1 |
| 163 | -j | -j | 1 | 1 | 201 | 0 | 0 | -1 | 1 |
| 164 | -1 | -j | 1 | 1 | 202 | 1 | 0 | -1 | 1 |
| 165 | +j | -j | 1 | 1 | 203 | -j | 0 | -1 | 1 |
| 166 | 0 | -1 | 1 | 1 | 204 | -1 | 0 | -1 | 1 |
| 167 | 1 | -1 | 1 | 1 | 205 | +j | 0 | -1 | 1 |
| 168 | -j | -1 | 1 | 1 | 206 | 0 | 1 | -1 | 1 |
| 169 | -1 | -1 | 1 | 1 | 207 | 1 | 1 | -1 | 1 |
| 170 | +j | -1 | 1 | 1 | 208 | -j | 1 | -1 | 1 |
| 171 | 0 | +j | 1 | 1 | 209 | -1 | 1 | -1 | 1 |
| 172 | 1 | +j | 1 | 1 | 210 | +j | 1 | -1 | 1 |
| 173 | -j | +j | 1 | 1 | 211 | 0 | -j | -1 | 1 |
| 174 | -1 | +j | 1 | 1 | 212 | 1 | -j | -1 | 1 |
| 175 | +j | +j | 1 | 1 | 213 | -j | -j | -1 | 1 |
| 176 | 0 | 0 | -j | 1 | 214 | -1 | -j | -1 | 1 |
| 177 | 1 | 0 | -j | 1 | 215 | +j | -j | -1 | 1 |
| 178 | -j | 0 | -j | 1 | 216 | 0 | -1 | -1 | 1 |
| 179 | -1 | 0 | -j | 1 | 217 | 1 | -1 | -1 | 1 |
| 180 | +j | 0 | -j | 1 | 218 | -j | -1 | -1 | 1 |
| 181 | 0 | 1 | -j | 1 | 219 | -1 | -1 | -1 | 1 |
| 182 | 1 | 1 | -j | 1 | 220 | +j | -1 | -1 | 1 |
| 183 | -j | 1 | -j | 1 | 221 | 0 | +j | -1 | 1 |
| 184 | -1 | 1 | -j | 1 | 222 | 1 | +j | -1 | 1 |
| 185 | +j | 1 | -j | 1 | 223 | -j | +j | -1 | 1 |
| 186 | 0 | -j | -j | 1 | 224 | -1 | +j | -1 | 1 |
| 187 | 1 | -j | -j | 1 | 225 | +j | +j | -1 | 1 |
| 188 | -j | -j | -j | 1 | 226 | 0 | 0 | +j | 1 |
| 189 | -1 | -j | -j | 1 | 227 | 1 | 0 | +j | 1 |
| 190 | +j | -j | -j | 1 | 228 | -j | 0 | +j | 1 |

FIG. 13D

Table 1, part 4

| Option# | k = -28 | k = -27 | k = 27 | k = 27 | Option# | k = -28 | k = -27 | k = 27 | k = 27 |
|---|---|---|---|---|---|---|---|---|---|
| 229 | -1 | 0 | +j | 1 | 267 | 1 | -1 | 0 | -j |
| 230 | +j | 0 | +j | 1 | 268 | -j | -1 | 0 | -j |
| 231 | 0 | 1 | +j | 1 | 269 | -1 | -1 | 0 | -j |
| 232 | 1 | 1 | +j | 1 | 270 | +j | -1 | 0 | -j |
| 233 | -j | 1 | +j | 1 | 271 | 0 | +j | 0 | -j |
| 234 | -1 | 1 | +j | 1 | 272 | 1 | +j | 0 | -j |
| 235 | +j | 1 | +j | 1 | 273 | -j | +j | 0 | -j |
| 236 | 0 | -j | +j | 1 | 274 | -1 | +j | 0 | -j |
| 237 | 1 | -j | +j | 1 | 275 | +j | +j | 0 | -j |
| 238 | -j | -j | +j | 1 | 276 | 0 | 0 | 1 | -j |
| 239 | -1 | -j | +j | 1 | 277 | 1 | 0 | 1 | -j |
| 240 | +j | -j | +j | 1 | 278 | -j | 0 | 1 | -j |
| 241 | 0 | -1 | +j | 1 | 279 | -1 | 0 | 1 | -j |
| 242 | 1 | -1 | +j | 1 | 280 | +j | 0 | 1 | -j |
| 243 | -j | -1 | +j | 1 | 281 | 0 | 1 | 1 | -j |
| 244 | -1 | -1 | +j | 1 | 282 | 1 | 1 | 1 | -j |
| 245 | +j | -1 | +j | 1 | 283 | -j | 1 | 1 | -j |
| 246 | 0 | +j | +j | 1 | 284 | -1 | 1 | 1 | -j |
| 247 | 1 | +j | +j | 1 | 285 | +j | 1 | 1 | -j |
| 248 | -j | +j | +j | 1 | 286 | 0 | -j | 1 | -j |
| 249 | -1 | +j | +j | 1 | 287 | 1 | -j | 1 | -j |
| 250 | +j | +j | +j | 1 | 288 | -j | -j | 1 | -j |
| 251 | 0 | 0 | 0 | -j | 289 | -1 | -j | 1 | -j |
| 252 | 1 | 0 | 0 | -j | 290 | +j | -j | 1 | -j |
| 253 | -j | 0 | 0 | -j | 291 | 0 | -1 | 1 | -j |
| 254 | -1 | 0 | 0 | -j | 292 | 1 | -1 | 1 | -j |
| 255 | +j | 0 | 0 | -j | 293 | -j | -1 | 1 | -j |
| 256 | 0 | 1 | 0 | -j | 294 | -1 | -1 | 1 | -j |
| 257 | 1 | 1 | 0 | -j | 295 | +j | -1 | 1 | -j |
| 258 | -j | 1 | 0 | -j | 296 | 0 | +j | 1 | -j |
| 259 | -1 | 1 | 0 | -j | 297 | 1 | +j | 1 | -j |
| 260 | +j | 1 | 0 | -j | 298 | -j | +j | 1 | -j |
| 261 | 0 | -j | 0 | -j | 299 | -1 | +j | 1 | -j |
| 262 | 1 | -j | 0 | -j | 300 | +j | +j | 1 | -j |
| 263 | -j | -j | 0 | -j | 301 | 0 | 0 | -j | -j |
| 264 | -1 | -j | 0 | -j | 302 | 1 | 0 | -j | -j |
| 265 | +j | -j | 0 | -j | 303 | -j | 0 | -j | -j |
| 266 | 0 | -1 | 0 | -j | 304 | -1 | 0 | -j | -j |

FIG. 13E

Table 1, part 5

| Option# | k = -28 | k = -27 | k = 27 | k = 27 | Option# | k = -28 | k = -27 | k = 27 | k = 27 |
|---|---|---|---|---|---|---|---|---|---|
| 305 | +j | 0 | -j | -j | 343 | -j | -1 | -1 | -j |
| 306 | 0 | 1 | -j | -j | 344 | -1 | -1 | -1 | -j |
| 307 | 1 | 1 | -j | -j | 345 | +j | -1 | -1 | -j |
| 308 | -j | 1 | -j | -j | 346 | 0 | +j | -1 | -j |
| 309 | -1 | 1 | -j | -j | 347 | 1 | +j | -1 | -j |
| 310 | +j | 1 | -j | -j | 348 | -j | +j | -1 | -j |
| 311 | 0 | -j | -j | -j | 349 | -1 | +j | -1 | -j |
| 312 | 1 | -j | -j | -j | 350 | +j | +j | -1 | -j |
| 313 | -j | -j | -j | -j | 351 | 0 | 0 | +j | -j |
| 314 | -1 | -j | -j | -j | 352 | 1 | 0 | +j | -j |
| 315 | +j | -j | -j | -j | 353 | -j | 0 | +j | -j |
| 316 | 0 | -1 | -j | -j | 354 | -1 | 0 | +j | -j |
| 317 | 1 | -1 | -j | -j | 355 | +j | 0 | +j | -j |
| 318 | -j | -1 | -j | -j | 356 | 0 | 1 | +j | -j |
| 319 | -1 | -1 | -j | -j | 357 | 1 | 1 | +j | -j |
| 320 | +j | -1 | -j | -j | 358 | -j | 1 | +j | -j |
| 321 | 0 | +j | -j | -j | 359 | -1 | 1 | +j | -j |
| 322 | 1 | +j | -j | -j | 360 | +j | 1 | +j | -j |
| 323 | -j | +j | -j | -j | 361 | 0 | -j | +j | -j |
| 324 | -1 | +j | -j | -j | 362 | 1 | -j | +j | -j |
| 325 | +j | +j | -j | -j | 363 | -j | -j | +j | -j |
| 326 | 0 | 0 | -1 | -j | 364 | -1 | -j | +j | -j |
| 327 | 1 | 0 | -1 | -j | 365 | +j | -j | +j | -j |
| 328 | -j | 0 | -1 | -j | 366 | 0 | -1 | +j | -j |
| 329 | -1 | 0 | -1 | -j | 367 | 1 | -1 | +j | -j |
| 330 | +j | 0 | -1 | -j | 368 | -j | -1 | +j | -j |
| 331 | 0 | 1 | -1 | -j | 369 | -1 | -1 | +j | -j |
| 332 | 1 | 1 | -1 | -j | 370 | +j | -1 | +j | -j |
| 333 | -j | 1 | -1 | -j | 371 | 0 | +j | +j | -j |
| 334 | -1 | 1 | -1 | -j | 372 | 1 | +j | +j | -j |
| 335 | +j | 1 | -1 | -j | 373 | -j | +j | +j | -j |
| 336 | 0 | -j | -1 | -j | 374 | -1 | +j | +j | -j |
| 337 | 1 | -j | -1 | -j | 375 | +j | +j | +j | -j |
| 338 | -j | -j | -1 | -j | 376 | 0 | 0 | 0 | -1 |
| 339 | -1 | -j | -1 | -j | 377 | 1 | 0 | 0 | -1 |
| 340 | +j | -j | -1 | -j | 378 | -j | 0 | 0 | -1 |
| 341 | 0 | -1 | -1 | -j | 379 | -1 | 0 | 0 | -1 |
| 342 | 1 | -1 | -1 | -j | 380 | +j | 0 | 0 | -1 |

FIG. 13F

Table 1, part 6

| Option# | k = -28 | k = -27 | k = 27 | k = 27 | Option# | k = -28 | k = -27 | k = 27 | k = 27 |
|---|---|---|---|---|---|---|---|---|---|
| 381 | 0 | 1 | 0 | -1 | 419 | -1 | -1 | 1 | -1 |
| 382 | 1 | 1 | 0 | -1 | 420 | +j | -1 | 1 | -1 |
| 383 | -j | 1 | 0 | -1 | 421 | 0 | +j | 1 | -1 |
| 384 | -1 | 1 | 0 | -1 | 422 | 1 | +j | 1 | -1 |
| 385 | +j | 1 | 0 | -1 | 423 | -j | +j | 1 | -1 |
| 386 | 0 | -j | 0 | -1 | 424 | -1 | +j | 1 | -1 |
| 387 | 1 | -j | 0 | -1 | 425 | +j | +j | 1 | -1 |
| 388 | -j | -j | 0 | -1 | 426 | 0 | 0 | -j | -1 |
| 389 | -1 | -j | 0 | -1 | 427 | 1 | 0 | -j | -1 |
| 390 | +j | -j | 0 | -1 | 428 | -j | 0 | -j | -1 |
| 391 | 0 | -1 | 0 | -1 | 429 | -1 | 0 | -j | -1 |
| 392 | 1 | -1 | 0 | -1 | 430 | +j | 0 | -j | -1 |
| 393 | -j | -1 | 0 | -1 | 431 | 0 | 1 | -j | -1 |
| 394 | -1 | -1 | 0 | -1 | 432 | 1 | 1 | -j | -1 |
| 395 | +j | -1 | 0 | -1 | 433 | -j | 1 | -j | -1 |
| 396 | 0 | +j | 0 | -1 | 434 | -1 | 1 | -j | -1 |
| 397 | 1 | +j | 0 | -1 | 435 | +j | 1 | -j | -1 |
| 398 | -j | +j | 0 | -1 | 436 | 0 | -j | -j | -1 |
| 399 | -1 | +j | 0 | -1 | 437 | 1 | -j | -j | -1 |
| 400 | +j | +j | 0 | -1 | 438 | -j | -j | -j | -1 |
| 401 | 0 | 0 | 1 | -1 | 439 | -1 | -j | -j | -1 |
| 402 | 1 | 0 | 1 | -1 | 440 | +j | -j | -j | -1 |
| 403 | -j | 0 | 1 | -1 | 441 | 0 | -1 | -j | -1 |
| 404 | -1 | 0 | 1 | -1 | 442 | 1 | -1 | -j | -1 |
| 405 | +j | 0 | 1 | -1 | 443 | -j | -1 | -j | -1 |
| 406 | 0 | 1 | 1 | -1 | 444 | -1 | -1 | -j | -1 |
| 407 | 1 | 1 | 1 | -1 | 445 | +j | -1 | -j | -1 |
| 408 | -j | 1 | 1 | -1 | 446 | 0 | +j | -j | -1 |
| 409 | -1 | 1 | 1 | -1 | 447 | 1 | +j | -j | -1 |
| 410 | +j | 1 | 1 | -1 | 448 | -j | +j | -j | -1 |
| 411 | 0 | -j | 1 | -1 | 449 | -1 | +j | -j | -1 |
| 412 | 1 | -j | 1 | -1 | 450 | +j | +j | -j | -1 |
| 413 | -j | -j | 1 | -1 | 451 | 0 | 0 | -1 | -1 |
| 414 | -1 | -j | 1 | -1 | 452 | 1 | 0 | -1 | -1 |
| 415 | +j | -j | 1 | -1 | 453 | -j | 0 | -1 | -1 |
| 416 | 0 | -1 | 1 | -1 | 454 | -1 | 0 | -1 | -1 |
| 417 | 1 | -1 | 1 | -1 | 455 | +j | 0 | -1 | -1 |
| 418 | -j | -1 | 1 | -1 | 456 | 0 | 1 | -1 | -1 |

FIG. 13G

Table 1, part 7

| Option# | k = -28 | k = -27 | k = 27 | k = 27 | Option# | k = -28 | k = -27 | k = 27 | k = 27 |
|---|---|---|---|---|---|---|---|---|---|
| 457 | 1 | 1 | -1 | -1 | 495 | +j | -1 | +j | -1 |
| 458 | -j | 1 | -1 | -1 | 496 | 0 | +j | +j | -1 |
| 459 | -1 | 1 | -1 | -1 | 497 | 1 | +j | +j | -1 |
| 460 | +j | 1 | -1 | -1 | 498 | -j | +j | +j | -1 |
| 461 | 0 | -j | -1 | -1 | 499 | -1 | +j | +j | -1 |
| 462 | 1 | -j | -1 | -1 | 500 | +j | +j | +j | -1 |
| 463 | -j | -j | -1 | -1 | 501 | 0 | 0 | 0 | +j |
| 464 | -1 | -j | -1 | -1 | 502 | 1 | 0 | 0 | +j |
| 465 | +j | -j | -1 | -1 | 503 | -j | 0 | 0 | +j |
| 466 | 0 | -1 | -1 | -1 | 504 | -1 | 0 | 0 | +j |
| 467 | 1 | -1 | -1 | -1 | 505 | +j | 0 | 0 | +j |
| 468 | -j | -1 | -1 | -1 | 506 | 0 | 1 | 0 | +j |
| 469 | -1 | -1 | -1 | -1 | 507 | 1 | 1 | 0 | +j |
| 470 | +j | -1 | -1 | -1 | 508 | -j | 1 | 0 | +j |
| 471 | 0 | +j | -1 | -1 | 509 | -1 | 1 | 0 | +j |
| 472 | 1 | +j | -1 | -1 | 510 | +j | 1 | 0 | +j |
| 473 | -j | +j | -1 | -1 | 511 | 0 | -j | 0 | +j |
| 474 | -1 | +j | -1 | -1 | 512 | 1 | -j | 0 | +j |
| 475 | +j | +j | -1 | -1 | 513 | -j | -j | 0 | +j |
| 476 | 0 | 0 | +j | -1 | 514 | -1 | -j | 0 | +j |
| 477 | 1 | 0 | +j | -1 | 515 | +j | -j | 0 | +j |
| 478 | -j | 0 | +j | -1 | 516 | 0 | -1 | 0 | +j |
| 479 | -1 | 0 | +j | -1 | 517 | 1 | -1 | 0 | +j |
| 480 | +j | 0 | +j | -1 | 518 | -j | -1 | 0 | +j |
| 481 | 0 | 1 | +j | -1 | 519 | -1 | -1 | 0 | +j |
| 482 | 1 | 1 | +j | -1 | 520 | +j | -1 | 0 | +j |
| 483 | -j | 1 | +j | -1 | 521 | 0 | +j | 0 | +j |
| 484 | -1 | 1 | +j | -1 | 522 | 1 | +j | 0 | +j |
| 485 | +j | 1 | +j | -1 | 523 | -j | +j | 0 | +j |
| 486 | 0 | -j | +j | -1 | 524 | -1 | +j | 0 | +j |
| 487 | 1 | -j | +j | -1 | 525 | +j | +j | 0 | +j |
| 488 | -j | -j | +j | -1 | 526 | 0 | 0 | 1 | +j |
| 489 | -1 | -j | +j | -1 | 527 | 1 | 0 | 1 | +j |
| 490 | +j | -j | +j | -1 | 528 | -j | 0 | 1 | +j |
| 491 | 0 | -1 | +j | -1 | 529 | -1 | 0 | 1 | +j |
| 492 | 1 | -1 | +j | -1 | 530 | +j | 0 | 1 | +j |
| 493 | -j | -1 | +j | -1 | 531 | 0 | 1 | 1 | +j |
| 494 | -1 | -1 | +j | -1 | 532 | 1 | 1 | 1 | +j |

FIG. 13H

Table 1, part 8

| Option# | k = -28 | k = -27 | k = 27 | k = 27 | Option# | k = -28 | k = -27 | k = 27 | k = 27 |
|---|---|---|---|---|---|---|---|---|---|
| 533 | -j | 1 | 1 | +j | 571 | 0 | +j | -j | +j |
| 534 | -1 | 1 | 1 | +j | 572 | 1 | +j | -j | +j |
| 535 | +j | 1 | 1 | +j | 573 | -j | +j | -j | +j |
| 536 | 0 | -j | 1 | +j | 574 | -1 | +j | -j | +j |
| 537 | 1 | -j | 1 | +j | 575 | +j | +j | -j | +j |
| 538 | -j | -j | 1 | +j | 576 | 0 | 0 | -1 | +j |
| 539 | -1 | -j | 1 | +j | 577 | 1 | 0 | -1 | +j |
| 540 | +j | -j | 1 | +j | 578 | -j | 0 | -1 | +j |
| 541 | 0 | -1 | 1 | +j | 579 | -1 | 0 | -1 | +j |
| 542 | 1 | -1 | 1 | +j | 580 | +j | 0 | -1 | +j |
| 543 | -j | -1 | 1 | +j | 581 | 0 | 1 | -1 | +j |
| 544 | -1 | -1 | 1 | +j | 582 | 1 | 1 | -1 | +j |
| 545 | +j | -1 | 1 | +j | 583 | -j | 1 | -1 | +j |
| 546 | 0 | +j | 1 | +j | 584 | -1 | 1 | -1 | +j |
| 547 | 1 | +j | 1 | +j | 585 | +j | 1 | -1 | +j |
| 548 | -j | +j | 1 | +j | 586 | 0 | -j | -1 | +j |
| 549 | -1 | +j | 1 | +j | 587 | 1 | -j | -1 | +j |
| 550 | +j | +j | 1 | +j | 588 | -j | -j | -1 | +j |
| 551 | 0 | 0 | -j | +j | 589 | -1 | -j | -1 | +j |
| 552 | 1 | 0 | -j | +j | 590 | +j | -j | -1 | +j |
| 553 | -j | 0 | -j | +j | 591 | 0 | -1 | -1 | +j |
| 554 | -1 | 0 | -j | +j | 592 | 1 | -1 | -1 | +j |
| 555 | +j | 0 | -j | +j | 593 | -j | -1 | -1 | +j |
| 556 | 0 | 1 | -j | +j | 594 | -1 | -1 | -1 | +j |
| 557 | 1 | 1 | -j | +j | 595 | +j | -1 | -1 | +j |
| 558 | -j | 1 | -j | +j | 596 | 0 | +j | -1 | +j |
| 559 | -1 | 1 | -j | +j | 597 | 1 | +j | -1 | +j |
| 560 | +j | 1 | -j | +j | 598 | -j | +j | -1 | +j |
| 561 | 0 | -j | -j | +j | 599 | -1 | +j | -1 | +j |
| 562 | 1 | -j | -j | +j | 600 | +j | +j | -1 | +j |
| 563 | -j | -j | -j | +j | 601 | 0 | 0 | +j | +j |
| 564 | -1 | -j | -j | +j | 602 | 1 | 0 | +j | +j |
| 565 | +j | -j | -j | +j | 603 | -j | 0 | +j | +j |
| 566 | 0 | -1 | -j | +j | 604 | -1 | 0 | +j | +j |
| 567 | 1 | -1 | -j | +j | 605 | +j | 0 | +j | +j |
| 568 | -j | -1 | -j | +j | 606 | 0 | 1 | +j | +j |
| 569 | -1 | -1 | -j | +j | 607 | 1 | 1 | +j | +j |
| 570 | +j | -1 | -j | +j | 608 | -j | 1 | +j | +j |

FIG. 13I

Table 1, part 9

| Option# | k = -28 | k= -27 | k = 27 | k = 27 |
|---|---|---|---|---|
| 609 | -1 | 1 | +j | +j |
| 610 | +j | 1 | +j | +j |
| 611 | 0 | -j | +j | +j |
| 612 | 1 | -j | +j | +j |
| 613 | -j | -j | +j | +j |
| 614 | -1 | -j | +j | +j |
| 615 | +j | -j | +j | +j |
| 616 | 0 | -1 | +j | +j |
| 617 | 1 | -1 | +j | +j |

| Option# | k = -28 | k= -27 | k = 27 | k = 27 |
|---|---|---|---|---|
| 618 | -j | -1 | +j | +j |
| 619 | -1 | -1 | +j | +j |
| 620 | +j | -1 | +j | +j |
| 621 | 0 | +j | +j | +j |
| 622 | 1 | +j | +j | +j |
| 623 | -j | +j | +j | +j |
| 624 | -1 | +j | +j | +j |
| 625 | +j | +j | +j | +j |

FIG. 14A

Table 2, part 1

| PPDU Length [us] | Rate | Reserved | L-Length [Byte] | Tone Option # | PAPR [dB] |
|---|---|---|---|---|---|
| 32 | 6 | 1 | 59 | 79 | 3.762801861 |
| 40 | 7 | 0 | 128 | 167 | 3.991864977 |
| 44 | 5 | 0 | 102 | 167 | 3.937782118 |
| 48 | 2 | 0 | 38 | 207 | 3.914450265 |
| 52 | 3 | 1 | 61 | 29 | 3.542162849 |
| 52 | 5 | 1 | 124 | 134 | 3.823889142 |
| 56 | 3 | 0 | 73 | 156 | 3.92552363 |
| 56 | 2 | 1 | 45 | 466 | 3.944907656 |
| 56 | 5 | 1 | 154 | 129 | 3.970080672 |
| 60 | 5 | 0 | 159 | 407 | 3.987132397 |
| 60 | 6 | 0 | 228 | 9 | 3.928078616 |
| 60 | 6 | 1 | 232 | 466 | 3.988599619 |
| 64 | 6 | 0 | 248 | 126 | 3.951264644 |
| 64 | 1 | 1 | 44 | 34 | 3.932747681 |
| 64 | 2 | 1 | 58 | 9 | 3.815235322 |
| 64 | 6 | 1 | 243 | 381 | 3.97479528 |
| 64 | 7 | 1 | 272 | 469 | 3.78737323 |
| 68 | 0 | 0 | 32 | 31 | 3.936879524 |
| 68 | 4 | 1 | 132 | 7 | 3.666555952 |
| 68 | 7 | 1 | 313 | 151 | 3.931316017 |
| 72 | 6 | 0 | 294 | 154 | 3.997786131 |
| 72 | 7 | 0 | 333 | 6 | 3.942777894 |
| 72 | 3 | 1 | 107 | 2 | 3.698419606 |
| 72 | 3 | 1 | 111 | 92 | 3.981096161 |
| 80 | 3 | 1 | 128 | 44 | 3.937360355 |
| 84 | 3 | 1 | 135 | 32 | 3.911466112 |
| 84 | 6 | 1 | 379 | 379 | 3.939258669 |
| 88 | 5 | 0 | 286 | 141 | 3.60267899 |
| 88 | 7 | 0 | 435 | 32 | 3.989860944 |
| 92 | 6 | 0 | 427 | 77 | 3.942047735 |
| 96 | 7 | 1 | 499 | 9 | 3.97940583 |
| 104 | 7 | 1 | 563 | 157 | 3.972855 |
| 108 | 6 | 1 | 521 | 32 | 3.915706736 |
| 112 | 5 | 0 | 408 | 382 | 3.894761062 |
| 112 | 6 | 1 | 529 | 419 | 3.816358166 |

FIG. 14B

Table 2, part 2

| PPDU Length [us] | Rate | Reserved | L-Length [Byte] | Tone Option # | PAPR [dB] |
|---|---|---|---|---|---|
| 120 | 0 | 0 | 71 | 19 | 3.866925832 |
| 120 | 4 | 0 | 293 | 382 | 3.988643078 |
| 120 | 5 | 0 | 446 | 2 | 3.990212936 |
| 124 | 6 | 1 | 606 | 79 | 3.747086094 |
| 124 | 7 | 1 | 673 | 82 | 3.95153898 |
| 128 | 7 | 1 | 718 | 126 | 3.305837047 |
| 132 | 2 | 0 | 159 | 132 | 3.8019384 |
| 132 | 7 | 0 | 752 | 382 | 3.841816134 |
| 136 | 5 | 0 | 511 | 419 | 3.554007058 |
| 148 | 5 | 1 | 557 | 34 | 3.885068697 |
| 152 | 1 | 1 | 143 | 1 | 3.685792099 |
| 160 | 7 | 1 | 941 | 129 | 3.842587697 |
| 164 | 3 | 1 | 312 | 16 | 3.878557582 |
| 164 | 5 | 1 | 627 | 127 | 3.905609685 |
| 164 | 5 | 1 | 640 | 27 | 3.871442439 |
| 168 | 4 | 1 | 430 | 167 | 3.853271502 |
| 168 | 7 | 1 | 992 | 216 | 3.597178871 |
| 176 | 3 | 1 | 339 | 6 | 3.978292158 |
| 180 | 7 | 0 | 1053 | 131 | 3.956906681 |
| 180 | 7 | 0 | 1055 | 377 | 3.980397573 |
| 180 | 5 | 1 | 706 | 202 | 3.982037993 |
| 180 | 7 | 1 | 1052 | 419 | 3.953059082 |
| 184 | 7 | 1 | 1085 | 216 | 3.550828457 |
| 188 | 7 | 0 | 1106 | 394 | 3.818943848 |
| 196 | 0 | 0 | 126 | 152 | 3.892627591 |
| 196 | 7 | 0 | 1168 | 134 | 3.961045589 |
| 200 | 1 | 1 | 195 | 91 | 3.776459529 |
| 204 | 1 | 0 | 199 | 419 | 3.991945494 |
| 204 | 4 | 0 | 541 | 131 | 3.767795073 |
| 204 | 4 | 0 | 548 | 44 | 3.694326456 |
| 208 | 7 | 0 | 1249 | 404 | 3.782796789 |
| 208 | 5 | 1 | 831 | 44 | 3.859889524 |
| 212 | 3 | 0 | 422 | 141 | 3.879350775 |
| 212 | 3 | 0 | 426 | 457 | 3.819658714 |
| 212 | 1 | 1 | 212 | 416 | 3.841202832 |
| 216 | 1 | 0 | 214 | 382 | 3.908249601 |
| 216 | 7 | 0 | 1317 | 391 | 3.955655002 |

FIG. 14C

Table 2, part 3

| PPDU Length [us] | Rate | Reserved | L-Length [Byte] | Tone Option # | PAPR [dB] |
|---|---|---|---|---|---|
| 220 | 5 | 0 | 884 | 167 | 3.968745216 |
| 220 | 5 | 0 | 886 | 207 | 3.741494827 |
| 224 | 5 | 0 | 900 | 154 | 3.934450209 |
| 224 | 6 | 1 | 1201 | 216 | 3.956881481 |
| 228 | 7 | 1 | 1382 | 126 | 3.749893094 |
| 232 | 6 | 1 | 1267 | 16 | 3.996462839 |
| 236 | 5 | 1 | 960 | 169 | 3.75000645 |
| 240 | 6 | 1 | 1304 | 452 | 3.886186721 |
| 244 | 4 | 0 | 659 | 409 | 3.864017605 |
| 244 | 1 | 1 | 248 | 469 | 3.880797868 |
| 248 | 5 | 0 | 1016 | 16 | 3.747060677 |
| 248 | 7 | 0 | 1527 | 201 | 3.957976492 |
| 252 | 7 | 1 | 1556 | 219 | 3.91670903 |
| 256 | 7 | 0 | 1584 | 29 | 3.769057627 |
| 256 | 5 | 1 | 1053 | 156 | 3.816154869 |
| 260 | 3 | 0 | 536 | 77 | 3.914271194 |
| 260 | 4 | 1 | 708 | 2 | 3.93163148 |
| 268 | 5 | 0 | 1105 | 469 | 3.971805606 |
| 276 | 3 | 0 | 572 | 141 | 3.852670484 |
| 276 | 3 | 1 | 564 | 406 | 3.80761329 |
| 284 | 6 | 0 | 1560 | 167 | 3.593697899 |
| 288 | 7 | 1 | 1779 | 454 | 3.789368818 |
| 292 | 5 | 0 | 1220 | 452 | 3.576620096 |
| 300 | 0 | 0 | 205 | 384 | 3.918196584 |
| 300 | 6 | 1 | 1664 | 166 | 3.894372383 |
| 300 | 7 | 1 | 1884 | 206 | 3.878399329 |
| 308 | 0 | 0 | 212 | 144 | 3.910207635 |
| 308 | 4 | 0 | 849 | 82 | 3.601992156 |
| 308 | 1 | 1 | 317 | 1 | 3.512879786 |
| 312 | 6 | 1 | 1742 | 209 | 3.867544526 |
| 316 | 5 | 0 | 1316 | 209 | 3.817541072 |
| 316 | 6 | 1 | 1751 | 154 | 3.854441243 |
| 320 | 5 | 1 | 1336 | 131 | 3.719584339 |
| 324 | 7 | 1 | 2037 | 379 | 3.796184602 |
| 328 | 5 | 0 | 1372 | 132 | 3.8862931 |

FIG. 14D

Table 2, part 4

| PPDU Length [us] | Rate | Reserved | L-Length [Byte] | Tone Option # | PAPR [dB] |
|---|---|---|---|---|---|
| 328 | 7 | 0 | 2051 | 419 | 3.996609806 |
| 328 | 2 | 1 | 458 | 454 | 3.935739846 |
| 328 | 7 | 1 | 2058 | 77 | 3.854547968 |
| 336 | 7 | 0 | 2129 | 1 | 3.849086766 |
| 340 | 3 | 0 | 711 | 32 | 3.99719207 |
| 348 | 6 | 0 | 1941 | 459 | 3.896498464 |
| 348 | 6 | 0 | 1942 | 151 | 3.739350919 |
| 348 | 5 | 1 | 1460 | 382 | 3.929877228 |
| 364 | 6 | 1 | 2044 | 402 | 3.801077871 |
| 372 | 7 | 0 | 2357 | 34 | 3.8919655 |
| 372 | 1 | 1 | 389 | 469 | 3.920909617 |
| 376 | 6 | 0 | 2129 | 79 | 3.997216438 |
| 376 | 2 | 1 | 527 | 451 | 3.916742341 |
| 376 | 7 | 1 | 2381 | 217 | 3.955566421 |
| 376 | 7 | 1 | 2389 | 451 | 3.681459402 |
| 380 | 1 | 1 | 399 | 407 | 3.936702402 |
| 384 | 6 | 1 | 2177 | 219 | 3.961067525 |
| 388 | 5 | 1 | 1651 | 382 | 3.921486319 |
| 392 | 5 | 0 | 1658 | 19 | 3.956974862 |
| 392 | 7 | 0 | 2496 | 217 | 3.893832609 |
| 392 | 7 | 1 | 2481 | 166 | 3.802676908 |
| 396 | 1 | 1 | 419 | 76 | 3.603961052 |
| 396 | 6 | 1 | 2246 | 156 | 3.765301766 |
| 404 | 4 | 1 | 1138 | 404 | 3.618109781 |
| 408 | 5 | 0 | 1739 | 79 | 3.967205257 |
| 408 | 2 | 1 | 578 | 586 | 3.99397156 |
| 408 | 6 | 1 | 2324 | 9 | 3.794740948 |
| 412 | 5 | 0 | 1755 | 159 | 3.973023615 |
| 412 | 6 | 0 | 2326 | 7 | 3.839052445 |
| 420 | 6 | 1 | 2376 | 157 | 3.616267541 |
| 424 | 2 | 1 | 600 | 409 | 3.944136437 |
| 424 | 7 | 1 | 2707 | 216 | 3.602845916 |
| 440 | 7 | 1 | 2810 | 201 | 3.976656954 |
| 452 | 5 | 0 | 1937 | 4 | 3.965481584 |
| 452 | 6 | 1 | 2584 | 32 | 3.973361549 |
| 464 | 5 | 0 | 1979 | 17 | 3.95226135 |
| 464 | 6 | 1 | 2650 | 157 | 3.966463624 |

FIG. 14E

Table 2, part 5

| PPDU Length [us] | Rate | Reserved | L-Length [Byte] | Tone Option # | PAPR [dB] |
|---|---|---|---|---|---|
| 468 | 4 | 0 | 1340 | 82 | 3.984746741 |
| 472 | 6 | 0 | 2695 | 154 | 3.904927962 |
| 476 | 3 | 0 | 1017 | 91 | 3.860861607 |
| 476 | 7 | 0 | 3053 | 391 | 3.970442147 |
| 480 | 7 | 0 | 3099 | 94 | 3.829803621 |
| 480 | 2 | 1 | 683 | 76 | 3.874036243 |
| 488 | 7 | 0 | 3152 | 209 | 3.856912849 |
| 488 | 6 | 1 | 2791 | 207 | 3.971378077 |
| 488 | 7 | 1 | 3143 | 79 | 3.866059704 |
| 496 | 2 | 0 | 710 | 129 | 3.887493882 |
| 496 | 5 | 1 | 2133 | 27 | 3.516482741 |
| 504 | 7 | 1 | 3263 | 407 | 3.998431225 |
| 508 | 1 | 0 | 544 | 81 | 3.948295475 |
| 508 | 6 | 0 | 2906 | 152 | 3.776776767 |
| 516 | 7 | 1 | 3327 | 157 | 3.989776421 |
| 520 | 7 | 0 | 3364 | 166 | 3.964825901 |
| 524 | 6 | 1 | 3003 | 82 | 3.764325298 |
| 532 | 1 | 0 | 572 | 204 | 3.98278259 |
| 532 | 2 | 0 | 764 | 44 | 3.574621959 |
| 532 | 5 | 1 | 2286 | 9 | 3.675501015 |
| 536 | 5 | 1 | 2317 | 1 | 3.88746985 |
| 536 | 6 | 1 | 3077 | 402 | 3.515045939 |
| 536 | 7 | 1 | 3470 | 32 | 3.980057549 |
| 540 | 4 | 0 | 1555 | 29 | 3.600968732 |
| 544 | 7 | 1 | 3525 | 404 | 3.993239421 |
| 552 | 7 | 1 | 3581 | 17 | 3.708504543 |
| 556 | 1 | 0 | 597 | 452 | 3.958965879 |
| 560 | 7 | 1 | 3620 | 217 | 3.762601749 |
| 564 | 0 | 0 | 404 | 217 | 3.988504747 |
| 568 | 0 | 1 | 406 | 2 | 3.918764379 |
| 580 | 6 | 0 | 3350 | 79 | 3.954815984 |
| 580 | 7 | 0 | 3767 | 4 | 3.963441221 |
| 588 | 4 | 0 | 1694 | 26 | 3.808035473 |
| 588 | 7 | 1 | 3818 | 204 | 3.700805407 |
| 592 | 3 | 1 | 1280 | 132 | 3.792898661 |

FIG. 14F

Table 2, part 6

| PPDU Length [us] | Rate | Reserved | L-Length [Byte] | Tone Option # | PAPR [dB] |
|---|---|---|---|---|---|
| 596 | 4 | 0 | 1719 | 391 | 3.804110139 |
| 596 | 6 | 0 | 3450 | 159 | 3.888827476 |
| 600 | 2 | 0 | 862 | 154 | 3.993531044 |
| 600 | 7 | 0 | 3900 | 76 | 3.903405787 |
| 600 | 7 | 1 | 3889 | 206 | 3.922897007 |
| 604 | 7 | 1 | 3930 | 216 | 3.915822628 |
| 608 | 7 | 1 | 3956 | 94 | 3.499541073 |
| 612 | 2 | 1 | 882 | 409 | 3.895350713 |
| 612 | 5 | 1 | 2645 | 402 | 3.719743328 |
| 612 | 6 | 1 | 3529 | 376 | 3.992149568 |
| 620 | 7 | 1 | 4029 | 77 | 3.99301324 |
| 624 | 5 | 0 | 2698 | 384 | 3.920125992 |
| 624 | 4 | 1 | 1807 | 394 | 3.770751244 |
| 628 | 7 | 0 | 4074 | 202 | 3.865866231 |
| 628 | 7 | 0 | 4084 | 1 | 3.922620208 |
| 628 | 2 | 1 | 908 | 382 | 3.968672945 |
| 628 | 6 | 1 | 3642 | 216 | 3.994999477 |
| 632 | 6 | 1 | 3666 | 451 | 3.8084053 |
| 640 | 2 | 0 | 925 | 154 | 3.985629783 |
| 640 | 6 | 1 | 3706 | 207 | 3.950957417 |
| 644 | 5 | 0 | 2794 | 129 | 3.464388883 |
| 652 | 6 | 0 | 3767 | 94 | 3.986502928 |
| 652 | 6 | 1 | 3766 | 129 | 3.987625761 |
| 660 | 2 | 1 | 956 | 84 | 3.917854695 |
| 672 | 5 | 0 | 2929 | 202 | 3.9645807 |
| 676 | 5 | 0 | 2931 | 206 | 3.92302131 |
| 688 | 6 | 0 | 3998 | 384 | 3.903631588 |
| 688 | 6 | 1 | 3990 | 459 | 3.949437374 |
| 688 | 6 | 1 | 3994 | 379 | 3.871518423 |
| 700 | 5 | 0 | 3043 | 77 | 3.889289263 |
| 704 | 6 | 0 | 4081 | 7 | 3.802689139 |
| 704 | 1 | 1 | 763 | 6 | 3.925601665 |
| 704 | 6 | 1 | 4077 | 31 | 3.774967827 |
| 716 | 3 | 1 | 1558 | 92 | 3.979101991 |
| 724 | 5 | 0 | 3157 | 79 | 3.996154156 |
| 728 | 3 | 1 | 1583 | 94 | 3.790745443 |
| 728 | 5 | 1 | 3179 | 209 | 3.890803161 |

FIG. 14G

Table 2, part 7

| PPDU Length [us] | Rate | Reserved | L-Length [Byte] | Tone Option # | PAPR [dB] |
|---|---|---|---|---|---|
| 736 | 5 | 0 | 3217 | 44 | 3.943473376 |
| 760 | 5 | 0 | 3315 | 209 | 3.883099663 |
| 764 | 4 | 0 | 2218 | 94 | 3.973230826 |
| 772 | 1 | 1 | 841 | 219 | 3.990664415 |
| 772 | 2 | 1 | 1121 | 384 | 3.973435587 |
| 780 | 3 | 0 | 1700 | 2 | 3.866627166 |
| 796 | 0 | 1 | 578 | 409 | 3.828731535 |
| 804 | 5 | 0 | 3512 | 401 | 3.970692471 |
| 804 | 3 | 1 | 1756 | 467 | 3.958659462 |
| 812 | 5 | 0 | 3546 | 44 | 3.921928079 |
| 812 | 5 | 1 | 3544 | 466 | 3.886079333 |
| 820 | 5 | 0 | 3592 | 77 | 3.815286244 |
| 840 | 5 | 1 | 3672 | 217 | 3.731355212 |
| 844 | 1 | 1 | 920 | 4 | 3.943308402 |
| 860 | 5 | 0 | 3774 | 451 | 3.866537142 |
| 860 | 5 | 0 | 3776 | 26 | 3.764430874 |
| 860 | 3 | 1 | 1879 | 84 | 3.832309279 |
| 868 | 5 | 1 | 3797 | 76 | 3.657430171 |
| 872 | 1 | 1 | 954 | 466 | 3.878187767 |
| 872 | 5 | 1 | 3819 | 154 | 3.835610811 |
| 876 | 5 | 0 | 3841 | 457 | 3.969846081 |
| 876 | 4 | 1 | 2561 | 207 | 3.690786764 |
| 880 | 3 | 0 | 1923 | 219 | 3.848424301 |
| 896 | 5 | 1 | 3930 | 391 | 3.468147493 |
| 908 | 0 | 0 | 662 | 157 | 3.691641438 |
| 908 | 5 | 0 | 3975 | 381 | 3.787996459 |
| 908 | 5 | 1 | 3977 | 417 | 3.895438386 |
| 912 | 4 | 0 | 2664 | 157 | 3.743966509 |
| 920 | 5 | 1 | 4032 | 144 | 3.794691298 |
| 928 | 5 | 0 | 4075 | 459 | 3.960665186 |
| 940 | 2 | 0 | 1374 | 42 | 3.53311572 |
| 944 | 3 | 1 | 2071 | 82 | 3.925668067 |
| 948 | 4 | 1 | 2773 | 454 | 3.873483573 |
| 952 | 4 | 1 | 2784 | 41 | 3.700549697 |
| 972 | 4 | 0 | 2845 | 457 | 3.998075706 |
| 1000 | 4 | 1 | 2933 | 27 | 3.970604307 |

FIG. 14H

Table 2, part 8

| PPDU Length [us] | Rate | Reserved | L-Length [Byte] | Tone Option # | PAPR [dB] |
|---|---|---|---|---|---|
| 1008 | 4 | 0 | 2957 | 392 | 3.568890126 |
| 1012 | 0 | 1 | 739 | 219 | 3.919256524 |
| 1028 | 4 | 0 | 3009 | 402 | 3.829068145 |
| 1056 | 3 | 1 | 2321 | 6 | 3.845971186 |
| 1072 | 0 | 0 | 785 | 94 | 3.956983839 |
| 1076 | 2 | 1 | 1577 | 379 | 3.619616135 |
| 1076 | 4 | 1 | 3161 | 381 | 3.643255918 |
| 1080 | 2 | 0 | 1581 | 206 | 3.98516862 |
| 1084 | 4 | 0 | 3187 | 376 | 3.510945037 |
| 1084 | 3 | 1 | 2382 | 19 | 3.67797619 |
| 1084 | 3 | 1 | 2390 | 92 | 3.925487667 |
| 1088 | 4 | 0 | 3195 | 391 | 3.864159544 |
| 1100 | 3 | 0 | 2418 | 79 | 3.976262492 |
| 1116 | 3 | 0 | 2454 | 409 | 3.590566646 |
| 1120 | 4 | 0 | 3296 | 394 | 3.7693778 |
| 1128 | 3 | 1 | 2487 | 379 | 3.97720358 |
| 1132 | 3 | 0 | 2492 | 7 | 3.945727395 |
| 1144 | 4 | 0 | 3362 | 151 | 3.890385981 |
| 1148 | 1 | 0 | 1261 | 94 | 3.939927292 |
| 1148 | 1 | 0 | 1265 | 94 | 3.910386901 |
| 1176 | 2 | 0 | 1727 | 216 | 3.974629756 |
| 1180 | 3 | 0 | 2603 | 129 | 3.91237114 |
| 1184 | 1 | 1 | 1303 | 82 | 3.933329834 |
| 1192 | 4 | 0 | 3508 | 376 | 3.799245144 |
| 1196 | 2 | 0 | 1759 | 151 | 3.782612397 |
| 1204 | 1 | 1 | 1328 | 456 | 3.820754398 |
| 1216 | 3 | 1 | 2679 | 451 | 3.979663913 |
| 1228 | 4 | 1 | 3614 | 16 | 3.831107787 |
| 1232 | 4 | 0 | 3624 | 402 | 3.914747173 |
| 1256 | 4 | 0 | 3697 | 156 | 3.88606066 |
| 1268 | 3 | 0 | 2800 | 144 | 3.924656623 |
| 1268 | 1 | 1 | 1396 | 27 | 3.850625271 |
| 1268 | 2 | 1 | 1865 | 32 | 3.75695889 |
| 1272 | 4 | 0 | 3751 | 402 | 3.914510897 |
| 1272 | 3 | 1 | 2806 | 134 | 3.840870984 |

FIG. 14I

Table 2, part 9

| PPDU Length [us] | Rate | Reserved | L-Length [Byte] | Tone Option # | PAPR [dB] |
|---|---|---|---|---|---|
| 1276 | 3 | 1 | 2817 | 452 | 3.81090092 |
| 1280 | 3 | 0 | 2830 | 6 | 3.945929579 |
| 1280 | 4 | 0 | 3770 | 209 | 3.698422179 |
| 1292 | 3 | 0 | 2858 | 159 | 3.935155713 |
| 1292 | 3 | 1 | 2855 | 26 | 3.725632731 |
| 1304 | 1 | 1 | 1440 | 7 | 3.94481928 |
| 1304 | 3 | 1 | 2880 | 376 | 3.810484907 |
| 1308 | 1 | 1 | 1441 | 131 | 3.814512716 |
| 1316 | 3 | 0 | 2906 | 381 | 3.885721128 |
| 1320 | 1 | 1 | 1455 | 31 | 3.986214063 |
| 1320 | 2 | 1 | 1946 | 391 | 3.986716096 |
| 1324 | 4 | 1 | 3906 | 454 | 3.783378442 |
| 1348 | 4 | 1 | 3972 | 391 | 3.672438701 |
| 1360 | 2 | 0 | 2003 | 406 | 3.697554199 |
| 1368 | 4 | 0 | 4035 | 4 | 3.919013425 |
| 1368 | 1 | 1 | 1511 | 42 | 3.899404334 |
| 1368 | 3 | 1 | 3027 | 82 | 3.695670889 |
| 1372 | 3 | 0 | 3032 | 94 | 3.934103267 |
| 1372 | 4 | 0 | 4051 | 402 | 3.878814094 |
| 1376 | 0 | 1 | 1013 | 166 | 3.960865193 |
| 1384 | 0 | 1 | 1017 | 376 | 3.811742647 |
| 1388 | 2 | 0 | 2044 | 142 | 3.767824615 |
| 1396 | 1 | 1 | 1540 | 454 | 3.649309236 |
| 1412 | 0 | 0 | 1040 | 402 | 3.925863816 |
| 1444 | 0 | 0 | 1062 | 81 | 3.598023107 |
| 1460 | 3 | 1 | 3235 | 392 | 3.920808014 |
| 1512 | 3 | 1 | 3353 | 141 | 3.944454145 |
| 1520 | 3 | 0 | 3365 | 141 | 3.726144882 |
| 1556 | 3 | 0 | 3446 | 454 | 3.779852148 |
| 1560 | 1 | 1 | 1726 | 76 | 3.93677502 |
| 1568 | 3 | 0 | 3474 | 377 | 3.69489291 |
| 1572 | 3 | 1 | 3483 | 407 | 3.92896215 |
| 1588 | 3 | 0 | 3516 | 402 | 3.952379358 |
| 1600 | 0 | 1 | 1181 | 394 | 3.958721313 |
| 1608 | 1 | 1 | 1780 | 2 | 3.687080678 |
| 1620 | 3 | 0 | 3591 | 84 | 3.968248965 |
| 1636 | 3 | 1 | 3626 | 144 | 3.562455904 |

FIG. 14J

Table 2, part 10

| PPDU Length [us] | Rate | Reserved | L-Length [Byte] | Tone Option # | PAPR [dB] |
|---|---|---|---|---|---|
| 1684 | 3 | 1 | 3739 | 201 | 3.817976743 |
| 1700 | 3 | 1 | 3775 | 34 | 3.667223236 |
| 1720 | 3 | 1 | 3813 | 394 | 3.988721966 |
| 1732 | 3 | 1 | 3843 | 454 | 3.965213263 |
| 1752 | 3 | 1 | 3888 | 392 | 3.817495349 |
| 1756 | 0 | 0 | 1297 | 416 | 3.817081967 |
| 1764 | 0 | 0 | 1304 | 152 | 3.522473347 |
| 1768 | 0 | 0 | 1306 | 131 | 3.845125176 |
| 1804 | 0 | 1 | 1333 | 377 | 3.785397512 |
| 1820 | 0 | 1 | 1345 | 81 | 3.882729603 |
| 1828 | 1 | 0 | 2030 | 42 | 3.900975023 |
| 1828 | 2 | 0 | 2703 | 7 | 3.586852275 |
| 1856 | 2 | 1 | 2748 | 7 | 3.893474321 |
| 1888 | 2 | 0 | 2797 | 131 | 3.622565717 |
| 1896 | 2 | 0 | 2806 | 129 | 3.902025977 |
| 1900 | 2 | 0 | 2816 | 141 | 3.894759741 |
| 1904 | 1 | 0 | 2115 | 16 | 3.901774904 |
| 1908 | 1 | 1 | 2119 | 159 | 3.543239856 |
| 1924 | 1 | 1 | 2138 | 384 | 3.969230563 |
| 1924 | 2 | 1 | 2852 | 407 | 3.963034333 |
| 1944 | 0 | 1 | 1439 | 29 | 3.333554153 |
| 1948 | 1 | 0 | 2162 | 216 | 3.889988148 |
| 2024 | 0 | 0 | 1498 | 92 | 3.838384149 |
| 2052 | 0 | 1 | 1520 | 156 | 3.941359058 |
| 2072 | 0 | 1 | 1534 | 94 | 3.942786452 |
| 2088 | 2 | 1 | 3094 | 377 | 3.952991348 |
| 2120 | 2 | 0 | 3146 | 166 | 3.892490848 |
| 2128 | 2 | 0 | 3156 | 19 | 3.952510075 |
| 2168 | 2 | 1 | 3214 | 166 | 3.921014774 |
| 2172 | 2 | 0 | 3220 | 151 | 3.939588561 |
| 2180 | 2 | 0 | 3233 | 417 | 3.882772414 |
| 2188 | 1 | 1 | 2432 | 382 | 3.96795512 |
| 2204 | 2 | 1 | 3269 | 407 | 3.940112267 |
| 2216 | 1 | 0 | 2463 | 131 | 3.949924925 |
| 2216 | 2 | 1 | 3288 | 1 | 3.97232313 |

FIG. 14K

Table 2, part 11

| PPDU Length [us] | Rate | Reserved | L-Length [Byte] | Tone Option # | PAPR [dB] |
|---|---|---|---|---|---|
| 2240 | 2 | 0 | 3324 | 384 | 3.707079592 |
| 2268 | 2 | 0 | 3363 | 452 | 3.774760336 |
| 2284 | 1 | 1 | 2543 | 394 | 3.887108564 |
| 2372 | 2 | 0 | 3521 | 392 | 3.844273581 |
| 2376 | 2 | 0 | 3525 | 42 | 3.430105227 |
| 2452 | 1 | 0 | 2728 | 381 | 3.980618259 |
| 2452 | 1 | 1 | 2729 | 79 | 3.895872529 |
| 2456 | 0 | 1 | 1821 | 76 | 3.943915846 |
| 2484 | 0 | 1 | 1842 | 94 | 3.962637709 |
| 2516 | 2 | 0 | 3739 | 9 | 3.997768901 |
| 2532 | 2 | 1 | 3761 | 202 | 3.747486828 |
| 2548 | 2 | 1 | 3783 | 16 | 3.350507625 |
| 2564 | 1 | 1 | 2855 | 454 | 3.925995647 |
| 2580 | 1 | 1 | 2876 | 207 | 3.831347854 |
| 2588 | 1 | 0 | 2881 | 406 | 3.980297148 |
| 2612 | 1 | 1 | 2911 | 82 | 3.981202281 |
| 2640 | 2 | 0 | 3921 | 207 | 3.655602353 |
| 2724 | 1 | 1 | 3036 | 206 | 3.999834615 |
| 2740 | 2 | 1 | 4075 | 201 | 3.851745935 |
| 2880 | 1 | 0 | 3212 | 7 | 3.978806002 |
| 3004 | 0 | 1 | 2234 | 407 | 3.747833496 |
| 3012 | 0 | 0 | 2238 | 151 | 3.994119849 |
| 3040 | 0 | 1 | 2260 | 166 | 3.918731579 |
| 3068 | 0 | 1 | 2280 | 151 | 3.986743907 |
| 3080 | 1 | 1 | 3435 | 42 | 3.917379347 |
| 3108 | 0 | 0 | 2311 | 384 | 3.973821717 |
| 3124 | 1 | 0 | 3488 | 382 | 3.74869085 |
| 3164 | 0 | 0 | 2354 | 201 | 3.726700471 |
| 3252 | 1 | 1 | 3629 | 467 | 3.857632075 |
| 3264 | 0 | 1 | 2428 | 166 | 3.895314031 |
| 3356 | 0 | 0 | 2497 | 79 | 3.724660751 |
| 3416 | 1 | 1 | 3816 | 92 | 3.902241073 |
| 3432 | 0 | 1 | 2554 | 132 | 3.908445177 |
| 3472 | 1 | 1 | 3877 | 457 | 3.773597076 |
| 3500 | 1 | 1 | 3908 | 42 | 3.48554862 |
| 3564 | 1 | 0 | 3983 | 77 | 3.862729823 |
| 3620 | 0 | 0 | 2695 | 201 | 3.872295005 |

FIG. 14L

Table 2, part 12

| PPDU Length [us] | Rate | Reserved | L-Length [Byte] | Tone Option # | PAPR [dB] |
|---|---|---|---|---|---|
| 3648 | 0 | 1 | 2715 | 454 | 3.807478069 |
| 3664 | 0 | 0 | 2729 | 381 | 3.918250123 |
| 3744 | 0 | 1 | 2789 | 27 | 3.654244025 |
| 4024 | 0 | 1 | 2998 | 1 | 3.935065227 |
| 4064 | 0 | 0 | 3027 | 151 | 3.842349152 |
| 4076 | 0 | 0 | 3038 | 469 | 3.822131486 |
| 4116 | 0 | 0 | 3068 | 92 | 3.510961929 |
| 4212 | 0 | 1 | 3139 | 94 | 3.907771506 |
| 4224 | 0 | 0 | 3149 | 466 | 3.952041023 |
| 4388 | 0 | 1 | 3271 | 131 | 3.890357962 |
| 4644 | 0 | 0 | 3464 | 2 | 3.905623305 |
| 4716 | 0 | 1 | 3517 | 81 | 3.976991344 |
| 4844 | 0 | 1 | 3614 | 209 | 3.970973377 |
| 4908 | 0 | 1 | 3662 | 127 | 3.940137351 |
| 5024 | 0 | 1 | 3749 | 457 | 3.953210729 |
| 5060 | 0 | 1 | 3774 | 151 | 3.994863075 |
| 5228 | 0 | 1 | 3900 | 156 | 3.702364478 |
| 5428 | 0 | 1 | 4050 | 152 | 3.975117736 |
| 5472 | 0 | 1 | 4085 | 452 | 3.863355872 |

FIG. 15

Table 3

| Rate | Rate Bits |
|---|---|
| 0 | [1,1,0,1] |
| 1 | [1,1,1,1] |
| 2 | [0,1,0,1] |
| 3 | [0,1,1,1] |
| 4 | [1,0,0,1] |
| 5 | [1,0,1,1] |
| 6 | [0,0,0,1] |
| 7 | [0,0,1,1] |

FIG. 19

Table 4

| PAPR | RATE | L_LENGTH | PPDU Length | PAPR | RATE | L_LENGTH | PPDU Length |
|---|---|---|---|---|---|---|---|
| 4.167309808 | 6 | 248 | 64 | 4.043399466 | 5 | 3232 | 740 |
| 4.152617038 | 5 | 286 | 88 | 4.034357179 | 3 | 1726 | 792 |
| 4.202297142 | 5 | 401 | 112 | 3.995647596 | 5 | 3776 | 860 |
| 4.111764094 | 0 | 71 | 120 | 3.843941985 | 4 | 2957 | 1008 |
| 4.291803838 | 5 | 453 | 124 | 4.077362626 | 4 | 3187 | 1084 |
| 4.229574677 | 7 | 1055 | 180 | 4.062383295 | 4 | 3508 | 1192 |
| 4.286427159 | 7 | 1106 | 188 | 3.920967697 | 3 | 2906 | 1316 |
| 4.073744973 | 4 | 541 | 204 | 4.219620509 | 0 | 973 | 1324 |
| 4.16472391 | 7 | 1249 | 208 | 4.254420032 | 3 | 2946 | 1332 |
| 4.008348954 | 5 | 1016 | 248 | 4.010919132 | 1 | 1508 | 1364 |
| 4.200066147 | 3 | 572 | 276 | 4.28419038 | 0 | 1062 | 1444 |
| 4.1925881 | 5 | 1316 | 316 | 3.926267335 | 3 | 3365 | 1520 |
| 3.849086766 | 7 | 2129 | 336 | 4.296889779 | 3 | 3591 | 1620 |
| 4.245836102 | 7 | 2217 | 352 | 4.241113983 | 1 | 1943 | 1752 |
| 4.179181158 | 3 | 793 | 376 | 4.209427393 | 0 | 1297 | 1756 |
| 4.148075016 | 5 | 1880 | 440 | 4.198982537 | 1 | 2105 | 1896 |
| 4.235842566 | 7 | 3152 | 488 | 4.184503678 | 2 | 2816 | 1900 |
| 4.028286278 | 4 | 1555 | 540 | 4.137371629 | 1 | 2115 | 1904 |
| 4.247163178 | 0 | 404 | 564 | 4.220438472 | 1 | 2434 | 2188 |
| 4.24769105 | 3 | 1257 | 584 | 4.100122145 | 0 | 2311 | 3108 |
| 4.262130658 | 6 | 3428 | 592 | 4.243301592 | 1 | 3488 | 3124 |
| 4.278507004 | 4 | 1719 | 596 | 3.932426386 | 0 | 2354 | 3164 |
| 4.184487054 | 7 | 3900 | 600 | 4.122894654 | 1 | 3829 | 3428 |
| 3.922620208 | 7 | 4084 | 628 | 4.144912703 | 1 | 3996 | 3576 |
| 3.935463938 | 5 | 2794 | 644 | 4.211458119 | 0 | 3038 | 4076 |
| 4.109268582 | 5 | 2929 | 672 | 4.120524101 | 0 | 3464 | 4644 |

Table 5

| PAPR | RATE | L_LENGTH | PPDU Length |
|---|---|---|---|
| 3.849086766 | 7 | 2129 | 336 |
| 3.922620208 | 7 | 4084 | 628 |
| 3.935463938 | 5 | 2794 | 644 |
| 3.995647596 | 5 | 3776 | 860 |
| 3.843941985 | 4 | 2957 | 1008 |
| 3.920967697 | 3 | 2906 | 1316 |
| 3.926267335 | 3 | 3365 | 1520 |
| 3.932426386 | 0 | 2354 | 3164 |

FIG. 24A

Table 6, part 1

| PAPR [dB] | k | | | | | | | | | | | | |
|---|---|---|---|---|---|---|---|---|---|---|---|---|---|
| | -6 | -5 | -4 | -3 | -2 | -1 | 0 | 1 | 2 | 3 | 4 | 5 | 6 |
| 2.062582 | -1 | 1 | -1 | -1 | 1 | -1 | | -1 | -1 | -1 | 1 | 1 | 1 |
| 2.062582 | -1 | -1 | -1 | 1 | 1 | 1 | | 1 | -1 | 1 | 1 | -1 | 1 |
| 2.062582 | 1 | 1 | 1 | -1 | -1 | -1 | | -1 | 1 | -1 | -1 | 1 | -1 |
| 2.062582 | 1 | -1 | 1 | 1 | -1 | 1 | | 1 | 1 | 1 | -1 | -1 | -1 |
| 2.193824 | 1 | -1 | -1 | 1 | 1 | -1 | | -1 | 1 | 1 | 1 | 1 | 1 |
| 2.193824 | 1 | 1 | 1 | 1 | 1 | -1 | | -1 | 1 | 1 | -1 | -1 | 1 |
| 2.193824 | -1 | -1 | -1 | -1 | -1 | 1 | | 1 | -1 | -1 | 1 | 1 | -1 |
| 2.193824 | -1 | 1 | 1 | -1 | -1 | 1 | | 1 | -1 | -1 | -1 | -1 | -1 |
| 2.248484 | 1 | -1 | 1 | -1 | -1 | 1 | | -1 | -1 | 1 | 1 | 1 | 1 |
| 2.248484 | 1 | 1 | 1 | 1 | -1 | -1 | | 1 | -1 | -1 | 1 | -1 | 1 |
| 2.248484 | -1 | -1 | -1 | -1 | 1 | 1 | | -1 | 1 | 1 | -1 | 1 | -1 |
| 2.248484 | -1 | 1 | -1 | 1 | 1 | -1 | | 1 | 1 | -1 | -1 | -1 | -1 |
| 2.615311 | 1 | -1 | 1 | -1 | 1 | 1 | | 1 | 1 | -1 | -1 | 1 | 1 |
| 2.615311 | 1 | 1 | -1 | -1 | 1 | 1 | | 1 | 1 | -1 | 1 | -1 | 1 |
| 2.615311 | -1 | -1 | 1 | 1 | -1 | -1 | | -1 | -1 | 1 | -1 | 1 | -1 |
| 2.615311 | -1 | 1 | -1 | 1 | -1 | -1 | | -1 | -1 | 1 | 1 | -1 | -1 |
| 2.780725 | -1 | 1 | 1 | -1 | -1 | -1 | | -1 | -1 | -1 | 1 | -1 | 1 |
| 2.780725 | -1 | 1 | -1 | 1 | 1 | 1 | | 1 | 1 | 1 | -1 | -1 | 1 |
| 2.780725 | 1 | -1 | 1 | -1 | -1 | -1 | | -1 | -1 | -1 | 1 | 1 | -1 |
| 2.780725 | 1 | -1 | -1 | 1 | 1 | 1 | | 1 | 1 | 1 | -1 | 1 | -1 |
| 2.799889 | -1 | -1 | 1 | 1 | -1 | 1 | | 1 | -1 | 1 | 1 | 1 | 1 |
| 2.799889 | -1 | -1 | -1 | -1 | 1 | -1 | | -1 | 1 | -1 | -1 | 1 | 1 |
| 2.799889 | 1 | 1 | 1 | 1 | -1 | 1 | | 1 | -1 | 1 | 1 | -1 | -1 |
| 2.799889 | 1 | 1 | -1 | -1 | 1 | -1 | | -1 | 1 | -1 | -1 | -1 | -1 |
| 2.839136 | 1 | -1 | 1 | -1 | -1 | -1 | | 1 | -1 | -1 | 1 | 1 | 1 |
| 2.839136 | -1 | 1 | -1 | 1 | 1 | 1 | | -1 | 1 | 1 | -1 | -1 | -1 |
| 2.839136 | 1 | 1 | 1 | -1 | -1 | 1 | | -1 | -1 | -1 | 1 | -1 | 1 |

FIG. 24B

Table 6, part 2

| PAPR [dB] | k | | | | | | | | | | | | |
|---|---|---|---|---|---|---|---|---|---|---|---|---|---|
| | -6 | -5 | -4 | -3 | -2 | -1 | 0 | 1 | 2 | 3 | 4 | 5 | 6 |
| 2.839136 | -1 | -1 | -1 | 1 | 1 | -1 | | 1 | 1 | 1 | -1 | 1 | -1 |
| 2.880277 | -1 | 1 | 1 | -1 | -1 | -1 | | -1 | 1 | -1 | 1 | 1 | 1 |
| 2.880277 | -1 | -1 | -1 | 1 | -1 | 1 | | 1 | 1 | 1 | -1 | -1 | 1 |
| 2.880277 | 1 | 1 | 1 | -1 | 1 | -1 | | -1 | -1 | -1 | 1 | 1 | -1 |
| 2.880277 | 1 | -1 | -1 | 1 | 1 | 1 | | 1 | -1 | 1 | -1 | -1 | -1 |
| 2.963164 | -1 | 1 | -1 | 1 | 1 | -1 | | -1 | 1 | 1 | 1 | 1 | 1 |
| 2.963164 | -1 | -1 | -1 | -1 | -1 | 1 | | 1 | -1 | -1 | 1 | -1 | 1 |
| 2.963164 | 1 | 1 | 1 | 1 | 1 | -1 | | -1 | 1 | 1 | -1 | 1 | -1 |
| 2.963164 | 1 | -1 | 1 | -1 | -1 | 1 | | 1 | -1 | -1 | -1 | -1 | -1 |
| 2.979719 | -1 | 1 | -1 | 1 | -1 | -1 | | -1 | -1 | 1 | 1 | 1 | 1 |
| 2.979719 | -1 | -1 | -1 | -1 | 1 | 1 | | 1 | 1 | -1 | 1 | -1 | 1 |
| 2.979719 | 1 | 1 | 1 | 1 | -1 | -1 | | -1 | -1 | 1 | -1 | 1 | -1 |
| 2.979719 | 1 | -1 | 1 | -1 | 1 | 1 | | 1 | 1 | -1 | -1 | -1 | -1 |
| 3.027564 | -1 | 1 | -1 | -1 | -1 | -1 | | -1 | 1 | -1 | -1 | 1 | 1 |
| 3.027564 | 1 | -1 | 1 | 1 | 1 | 1 | | 1 | -1 | 1 | 1 | -1 | -1 |
| 3.027564 | -1 | -1 | 1 | 1 | -1 | 1 | | 1 | 1 | 1 | 1 | -1 | 1 |
| 3.027564 | 1 | 1 | -1 | -1 | 1 | -1 | | -1 | -1 | -1 | -1 | 1 | -1 |
| 3.05182 | 1 | -1 | 1 | 1 | -1 | -1 | | 1 | -1 | 1 | 1 | 1 | 1 |
| 3.05182 | 1 | 1 | 1 | 1 | -1 | 1 | | -1 | -1 | 1 | 1 | -1 | 1 |
| 3.05182 | -1 | -1 | -1 | -1 | 1 | 1 | | 1 | 1 | -1 | -1 | 1 | -1 |
| 3.05182 | -1 | 1 | -1 | -1 | 1 | 1 | | -1 | 1 | -1 | -1 | -1 | -1 |
| 3.05966 | 1 | 1 | -1 | 1 | -1 | 1 | | -1 | -1 | 1 | 1 | 1 | 1 |
| 3.05966 | 1 | 1 | 1 | 1 | -1 | -1 | | 1 | -1 | 1 | -1 | 1 | 1 |
| 3.05966 | -1 | -1 | -1 | -1 | 1 | 1 | | -1 | 1 | -1 | 1 | -1 | -1 |
| 3.05966 | -1 | -1 | 1 | -1 | 1 | -1 | | 1 | 1 | -1 | -1 | -1 | -1 |
| 3.082099 | -1 | 1 | -1 | 1 | -1 | -1 | | -1 | -1 | -1 | -1 | 1 | 1 |
| 3.082099 | -1 | -1 | 1 | 1 | 1 | 1 | | 1 | 1 | -1 | 1 | -1 | 1 |
| 3.082099 | 1 | 1 | -1 | -1 | -1 | -1 | | -1 | -1 | 1 | -1 | 1 | -1 |
| 3.082099 | 1 | -1 | 1 | -1 | 1 | 1 | | 1 | 1 | 1 | 1 | -1 | -1 |
| 3.096002 | 1 | -1 | 1 | 1 | -1 | 1 | | -1 | -1 | -1 | 1 | 1 | 1 |
| 3.096002 | 1 | 1 | 1 | -1 | -1 | -1 | | 1 | -1 | 1 | 1 | -1 | 1 |
| 3.096002 | -1 | -1 | -1 | 1 | 1 | 1 | | -1 | 1 | -1 | -1 | 1 | -1 |
| 3.096002 | -1 | 1 | -1 | -1 | 1 | -1 | | 1 | 1 | 1 | -1 | -1 | -1 |

FIG. 25
Table 7

| PAPR [dB] | u |
|---|---|
| 3.64644407 | 6 |
| 3.721793675 | 10 |
| 3.806447271 | 7 |
| 3.898429394 | 3 |
| 4.377213179 | 1 |
| 4.593866219 | 12 |
| 5.129765743 | 8 |
| 5.155753498 | 5 |
| 5.476821551 | 2 |
| 5.637949604 | 11 |
| 5.858992697 | 9 |
| 5.917069839 | 4 |

FIG. 26
Table 8

| PAPR [dB] | k | | | | | | | | | | | | |
|---|---|---|---|---|---|---|---|---|---|---|---|---|---|
| | -6 | -5 | -4 | -3 | -2 | -1 | 0 | 1 | 2 | 3 | 4 | 5 | 6 |
| 3.004875 | 1 | -1 | 1 | 1 | -1 | 0 | 0 | 0 | -1 | -1 | 1 | 1 | 1 |
| 3.095638 | -1 | 1 | 1 | -1 | 1 | 0 | 0 | 0 | -1 | -1 | -1 | 1 | 1 |
| 3.004875 | 1 | 1 | 1 | -1 | -1 | 0 | 0 | 0 | -1 | 1 | 1 | -1 | 1 |
| 3.095638 | -1 | -1 | 1 | 1 | 1 | 0 | 0 | 0 | -1 | 1 | -1 | -1 | 1 |
| 3.095638 | 1 | 1 | -1 | -1 | -1 | 0 | 0 | 0 | 1 | -1 | 1 | 1 | -1 |
| 3.004875 | -1 | -1 | -1 | 1 | 1 | 0 | 0 | 0 | 1 | -1 | -1 | 1 | -1 |
| 3.095638 | 1 | -1 | -1 | 1 | -1 | 0 | 0 | 0 | 1 | 1 | 1 | -1 | -1 |
| 3.004875 | -1 | 1 | -1 | -1 | 1 | 0 | 0 | 0 | 1 | 1 | -1 | -1 | -1 |

FIG. 27
Table 9
| PAPR [dB] | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| 2.633557 | -1 | 1 | -1 | -1 | 1 | -1 | 0 | 0 | 0 | -1 | -1 | -1 | 1 | 1 | 1 |
| 2.633557 | -1 | -1 | -1 | 1 | 1 | 1 | 0 | 0 | 0 | 1 | -1 | 1 | 1 | -1 | 1 |
| 2.633557 | 1 | 1 | 1 | -1 | -1 | -1 | 0 | 0 | 0 | -1 | 1 | -1 | -1 | 1 | -1 |
| 2.633557 | 1 | -1 | 1 | 1 | -1 | 1 | 0 | 0 | 0 | 1 | 1 | 1 | -1 | -1 | -1 |
| 3.003893 | 1 | -1 | -1 | 1 | -1 | -1 | 0 | 0 | 0 | -1 | -1 | -1 | 1 | 1 | 1 |
| 3.003893 | 1 | 1 | 1 | -1 | -1 | -1 | 0 | 0 | 0 | -1 | -1 | 1 | -1 | -1 | 1 |
| 3.003893 | -1 | -1 | -1 | 1 | 1 | 1 | 0 | 0 | 0 | 1 | 1 | -1 | 1 | 1 | -1 |
| 3.003893 | -1 | 1 | 1 | -1 | 1 | 1 | 0 | 0 | 0 | 1 | 1 | -1 | -1 | -1 | -1 |
| 3.033518 | 1 | -1 | 1 | 1 | -1 | 1 | 0 | 0 | 0 | -1 | -1 | -1 | 1 | 1 | 1 |
| 3.033518 | 1 | 1 | 1 | -1 | -1 | -1 | 0 | 0 | 0 | 1 | -1 | 1 | 1 | -1 | 1 |
| 3.033518 | -1 | -1 | -1 | 1 | 1 | 1 | 0 | 0 | 0 | -1 | 1 | -1 | -1 | 1 | -1 |
| 3.033518 | -1 | 1 | -1 | -1 | 1 | -1 | 0 | 0 | 0 | 1 | 1 | 1 | -1 | -1 | -1 |
| 3.088763 | -1 | 1 | -1 | 1 | -1 | -1 | 0 | 0 | 0 | -1 | -1 | 1 | 1 | 1 | 1 |
| 3.088763 | -1 | -1 | -1 | -1 | 1 | 1 | 0 | 0 | 0 | 1 | 1 | -1 | 1 | -1 | 1 |
| 3.088763 | 1 | 1 | 1 | 1 | -1 | -1 | 0 | 0 | 0 | -1 | -1 | 1 | -1 | 1 | -1 |
| 3.088763 | 1 | -1 | 1 | -1 | 1 | 1 | 0 | 0 | 0 | 1 | 1 | -1 | -1 | -1 | -1 |
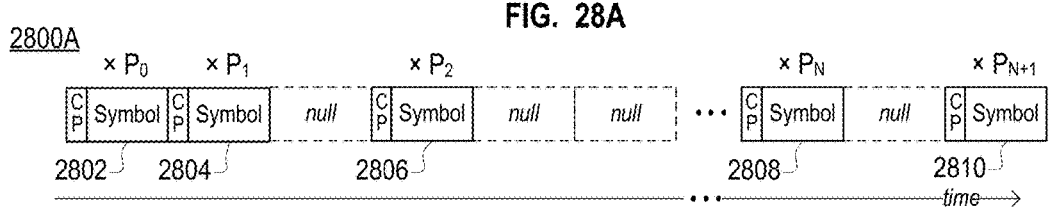
FIG. 28A
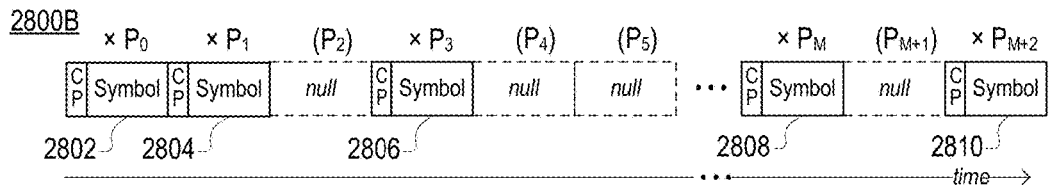
FIG. 28B
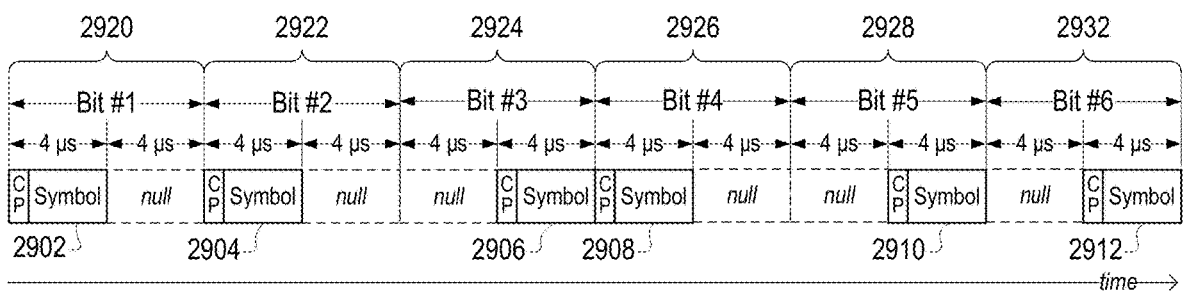
FIG. 29

Table 10

| Input Bit [b0, b1] | Output Bit [b0, b1, b2] |
|---|---|
| 0 0 | 0 1 1 |
| 0 1 | 1 0 1 |
| 1 0 | 1 1 0 |
| 1 1 | 1 1 1 |

Table 11

| Input Bit [b0, b1, b2] | Output Bit [b0, b1, b2, b4] |
|---|---|
| 0 0 0 | 0 1 1 1 |
| 0 0 1 | 1 0 1 1 |
| 0 1 0 | 1 1 0 1 |
| 0 1 1 | 1 1 1 0 |
| 1 0 0 | 1 0 0 1 |
| 1 0 1 | 0 1 0 1 |
| 1 1 0 | 1 0 1 0 |
| 1 1 1 | 1 1 1 1 |

Table 12

| Input Bit [b0, b1, b2] | Output Bit [b0, b1, b2, b4] |
|---|---|
| 0 0 0 | 0 1 1 1 |
| 0 0 1 | 1 0 1 1 |
| 0 1 0 | 1 1 0 1 |
| 0 1 1 | 1 1 1 0 |
| 1 0 0 | 1 0 0 1 |
| 1 0 1 | 0 1 0 1 |
| 1 1 0 | 1 0 1 0 |
| 1 1 1 | 0 1 1 0 |

Table 13

| Input Bit [b0, b1, b2, b3] | Output Bit [b0, b1, b2, b4, b5] |
|---|---|
| 0 0 0 0 | 0 1 1 1 1 |
| 0 0 0 1 | 1 0 1 1 1 |
| 0 0 1 0 | 1 1 0 1 1 |
| 0 0 1 1 | 1 1 1 0 1 |
| 0 1 0 0 | 1 1 1 1 0 |
| 0 1 0 1 | 0 1 0 1 1 |
| 0 1 1 0 | 0 1 1 0 1 |
| 0 1 1 1 | 0 1 1 1 0 |
| 1 0 0 0 | 1 0 0 1 1 |
| 1 0 0 1 | 1 0 1 0 1 |
| 1 0 1 0 | 1 0 1 1 0 |
| 1 0 1 1 | 1 1 0 0 1 |
| 1 1 0 0 | 1 1 0 1 0 |
| 1 1 0 1 | 0 1 0 1 0 |
| 1 1 1 0 | 1 0 0 1 0 |
| 1 1 1 1 | 0 1 0 0 1 |

WIRELESS DEVICE LOW POWER WAKE UP

CROSS-REFERENCE TO RELATED APPLICATION

This application is a continuation of U.S. application Ser. No. 16/134,728, filed Sep. 18, 2018, which is a continuation of U.S. application Ser. No. 15/667,574, filed Aug. 2, 2017, now U.S. Pat. No. 10,129,064, which claims the benefit of U.S. Provisional Patent Application No. 62/370,145, filed Aug. 2, 2016, and U.S. Provisional Patent Application No. 62/371,095, filed Aug. 4, 2016, which are incorporated by reference herein in their entireties.

BACKGROUND

1. Technical Field

The technology described herein relates generally to wireless networking. More particularly, the technology relates to waking up a wireless local network device from a sleep mode.

2. Description of the Related Art

Wireless Local Area Network (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

In order to increase battery life, a device needs to sleep more. These longer sleep period results in increased latency because the device must be woken up before operations can be performed. To receive data with low latency, a device needs to sleep less, but sleeping less results in shorter battery life.

To resolve this trade-off between power consumption and data latency, a concept of low-power wake-up receiver was discussed in standardization of the IEEE 802.11 standard. IEEE Std 802.11ba relates to a companion radio for devices having main radio in accordance with other portions of the IEEE 802.11 standard. Conceptually, a communication device includes an IEEE 802.11 main radio and a low-power (LP) Wake-Up Receiver (WUR).

The main radio is used for user data transmission and reception. The main radio is turned off unless there is something to transmit or receive.

The LP-WUR operates to wake up the main radio when the LP WUR receives an indication that there is a packet for the device to receive. Once LP-WUR wakes up the main radio, data is transmitted and received by the main radio.

The LP-WUR is not for user data transmission/reception, and therefore the LP-WUR may be a simple receiver and may not include a transmitter. Because the LP-WUR is likely to be active while the main radio (and the rest of the device) is in a sleep mode, it is desirable that the LP-WUR consume very little power. Accordingly, the design of LP-WUR may be simple, which permits power consumption of LP-WUR to be much lower than that of the main radio. For example, a LP-WUR may use less than 100 µW when active.

To achieve the goal of simplicity and low power consumption, transmissions intended for the LP-WUR may use a simple modulation schemes, such as On-Off-Keying (OOK). OOK is a simple form of Amplitude-Shift Keying (ASK) modulation in which a bit of digital data is indicated by the presence or absence of a carrier wave.

To provide better support for long range and low power (LRLP) transmission, the wake-up packets for the LP-WUR should have a low Peak-to-Average-Power Ratio (PAPR).

SUMMARY

In an embodiment, a method performed by a wireless device comprises comprising: generating a Legacy preamble including a Legacy Short Training Field (L-STF), a Legacy Long Training Field (L-LTF) and a Legacy Signal (L-SIG) field; generating an 20 MHz Orthogonal Frequency Division Multiplexing (OFDM) symbol having a duration of 4 µs; generating a Wake-Up (WU) signal portion having a frequency bandwidth that is narrower than a frequency bandwidth of the Legacy preamble; and transmitting a frame. Transmitting the frame includes transmitting the Legacy preamble, transmitting the 20 MHz OFDM symbol immediately after transmitting the Legacy preamble, and transmitting the WU signal portion immediately after transmitting the 20 MHz OFDM symbol.

In an embodiment, the 20 MHz OFDM symbol is modulated with Binary Phase Shift Keying (BPSK).

In an embodiment, the OFDM symbol has a tone spacing of 312.5 kHz.

In an embodiment, the method further comprises transmitting the L-SIG field with extra tones not used to transmit the Legacy preamble.

In an embodiment, the extra tones have indexes of −28, −27, 27, and 28.

In an embodiment, the method further comprises selecting the contents of the extra tones to reduce a Peak to Average Power Ratio (PAPR) of the frame.

In an embodiment, the contents of the extra tones are selected according to the contents of the L-SIG field.

In an embodiment, the method further comprises determining the contents of the L-SIG field according to a length of the frame.

In an embodiment, generating the WU signal portion comprises generating WU signals and encoding a plurality of bits of the WU signals into a plurality of encoded bits to prevent long periods of zero transmission power during the transmission of the WU signals; and transmitting the WU signal portion comprises transmitting the plurality of encoded bits using On-Off Keying (OOK) immediately after transmitting the 20 MHz OFDM symbol.

In an embodiment, encoding the plurality of bits of the WU signal includes Manchester encoding the plurality of bits to produce the plurality of encoded bits.

In an embodiment, transmitting the plurality of encoded bits using On-Off Keying (OOK) comprises transmitting the plurality of encoded bits by transmitting a plurality of OFDM symbols.

In an embodiment, the 20 MHz OFDM symbol is a repeated cyclically-shifted L-SIG field corresponding to a repeated cyclically-shifted version of the L-SIG field.

In an embodiment, the L-SIG field includes a Cyclic Prefix at the beginning of the L-SIG field, the repeated cyclically-shifted L-SIG field includes a Cyclic Prefix at the end of the repeated cyclically-shifted L-SIG field, and the Cyclic Prefix of the L-SIG field is the same as the Cyclic Prefix of the repeated cyclically-shifted L-SIG field.

In an embodiment, the contents of the repeated cyclically-shifted L-SIG field, excluding the CP of the repeated cyclically-shifted L-SIG field, are the same as the contents of the L-SIG field excluding the CP of the L-SIG field.

In an embodiment, a wireless device comprises a transmitter circuit. The wireless device is to 1) generate a Legacy preamble including a Legacy Short Training Field (L-STF), a Legacy Long Training Field (L-LTF) and a Legacy Signal (L-SIG) field; 2) generate an 20 MHz Orthogonal Frequency Division Multiplexing (OFDM) symbol having a duration of 4 µs; 3) generating a Wake-Up (WU) signal portion having a frequency bandwidth that is narrower than a frequency bandwidth of the Legacy preamble; and 4) transmit a frame using the transmitter circuit. Transmitting the frame includes transmitting the Legacy preamble, transmitting the 20 MHz OFDM symbol immediately after transmitting the Legacy preamble, and transmitting the WU signal portion immediately after transmitting the 20 MHz OFDM symbol.

In an embodiment, the 20 MHz OFDM symbol is modulated with Binary Phase Shift Keying (BPSK) and has a tone spacing of 312.5 kHz.

In an embodiment, transmitting the Legacy preamble comprises transmitting the L-SIG field with extra tones not used to transmit other portions of the Legacy preamble, and the extra tones have indexes of −28, −27, 27, and 28.

In an embodiment, generating the WU signal portion comprises generating WU signals and encoding a plurality of bits of the WU signals into a plurality of encoded bits to prevent long periods of zero transmission power during the transmission of the WU signals. Transmitting the WU signal portion comprises transmitting the plurality of encoded bits using On-Off Keying (OOK) immediately after transmitting the 20 MHz OFDM symbol.

In an embodiment, encoding the plurality of bits of the WU signal includes Manchester encoding the plurality of bits to produce the plurality of encoded bits, and transmitting the plurality of encoded bits using On-Off Keying (OOK) comprises transmitting the plurality of encoded bits by transmitting a plurality of Orthogonal Frequency Division Multiplexing (OFDM) symbols.

In an embodiment, the 20 MHz OFDM symbol is a repeated cyclically-shifted L-SIG field corresponding to a repeated cyclically-shifted version of the L-SIG field, the L-SIG field includes a Cyclic Prefix (CP) at the beginning of the L-SIG field, the repeated cyclically-shifted L-SIG field includes a CP at the end of the repeated cyclically-shifted L-SIG field, the CP of the L-SIG field is the same as the CP of the repeated cyclically-shifted L-SIG field, and the contents of the repeated cyclically-shifted L-SIG field, excluding the CP of the repeated cyclically-shifted L-SIG field, are the same as the contents of the L-SIG field excluding the CP of the L-SIG field.

BRIEF DESCRIPTION OF THE DRAWINGS

FIG. 1 illustrates a wireless network, according to an embodiment.

FIG. 2A is a schematic diagram of a wireless device according to an embodiment.

FIG. 2B shows power states of the wireless device according to an embodiment.

FIG. 9A illustrates a repeated Legacy Signal (L-SIG) field.

FIG. 9B illustrates a repeated cyclically-shifted L-SIG field according to an embodiment.

FIG. 10 shows field information for the contents of an L-SIG field.

FIG. 11 illustrates a process for adding extra tones to an L-SIG field according to an embodiment.

FIG. 13A includes part 1 of Table 1, which is a table of values which can be used to configured extra tones according to an embodiment. FIG. 13B includes part 2 of the Table 1. FIG. 13C includes part 3 of the Table 1. FIG. 13D includes part 4 of the Table 1. FIG. 13E includes part 5 of the Table 1. FIG. 13F includes part 6 of the Table 1. FIG. 13G includes part 7 of the Table 1. FIG. 13H includes part 8 of the Table 1. FIG. 13I includes part 9 of the Table 1.

FIG. 14A includes part 1 of Table 2, which is a table showing selections of a pattern from the Table 1 for use in the extra tones of an L-SIG field according to an embodiment. FIG. 14B includes part 2 of the Table 2. FIG. 14C includes part 3 of the Table 2. FIG. 14D includes part 4 of the Table 2. FIG. 14E includes part 5 of the Table 2. FIG. 14F includes part 6 of the Table 2. FIG. 14G includes part 7 of the Table 2. FIG. 14H includes part 8 of the Table 2. FIG. 14I includes part 9 of the Table 2. FIG. 14J includes part 10 of the Table 2. FIG. 14K includes part 11 of the Table 2. FIG. 14L includes part 12 of the Table 2.

FIG. 15 includes a table showing Rate index to Rate bit mapping for the Rate field of an L-SIG field according to an embodiment.

FIG. 19 includes a table showing Rate and L-Length values for an L-SIG field that result in good PAPRs for a given PPDU length according to an embodiment.

FIG. 24A includes part 1 of Table 6, which is a table showing PAPR values for patterns used to generate OFDM symbols of WUR signals of WU packets according to an embodiment. FIG. 24B includes part 2 of the Table 6.

FIG. 25 includes a table of root indexes for Zadoff-Chu sequences that provides good PAPR when used to generate OFDM symbols according to an embodiment.

FIG. 26 includes a table showing low PAPR sequences having DC tones that are good candidates for OOK symbols using a total of 13 tones according to an embodiment.

FIG. 27 includes a table showing low PAPR sequences having DC tones that are good candidates for OOK symbols using a total of 15 tones according to an embodiment.

FIG. 28A illustrates a process for varying OFDM symbols used for OOK transmission according to an embodiment.

FIG. 28B illustrates a process for varying OFDM symbols used for OOK transmission according to another embodiment.

FIG. 29 illustrates Manchester encoding of an OOK transmission according to an embodiment.

DETAILED DESCRIPTION

Figure 3A:
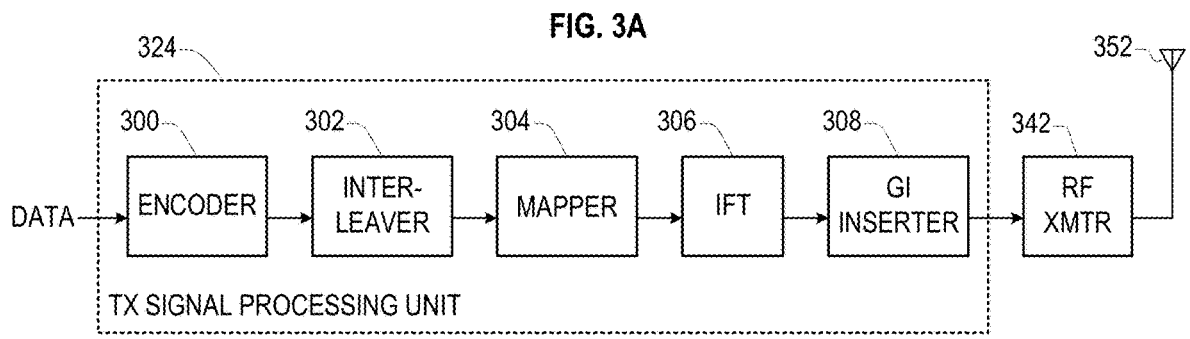
FIG. 3A illustrates components of a wireless device configured to transmit data, according to an embodiment.

The technology described herein relates generally to wireless networking. More particularly, the technology relates to improving battery life to battery powered wireless devices while providing a low latency response to service requests to the wireless device.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless networks includes an infrastructure Basic Service Set (BSS) 100 of a Wireless Local Area Networks (WLAN). In an 802.11 WLAN, the BSS provides the basic organizational unit and typically includes an Access Point (AP) and one or more associated stations (STAs).

The first BSS 100 includes an Access Point 102 (also referred to as AP) wirelessly communicating with first, second, and third wireless devices (or stations) 104, 106, and 108 (also referred to as stations STA1, STA2, and STA3, respectively). The wireless devices may each include a medium access control (MAC) layer and a physical (PHY) layer according to an IEEE 802.11 standard.

Although FIG. 1 shows the first BSS 100 including only the first to third stations STA1 to STA3, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA3 in the first BSS 100 using a single frame, or may simultaneously transmit information to two or more of the stations STA1 to STA3 in the first BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA3 may each transmit data to the AP 102 using a single frame, or transmit information to and receive information from each other using a single frame. Two or more of the stations STA1 to STA3 may simultaneously transmit data to the AP 102 using an Uplink (UL) OFDMA frame, an UL MU-MIMO frame, or an UL MU-MIMO OFDMA frame.

In another embodiment, the AP 102 may be absent and the stations STA1 to STA3 may be in an ad-hoc network.

FIG. 1 shows a wakeup (WU) transmission 112, an uplink (UL) transmission 114, and a down-link (DL) transmission 116 of the first BSS 100. The WU transmission 112 includes a WU packet addressed to the first station STA1 that is received by a Low Power Wake-Up Radio (LP-WUR) of the first station STA1.

The WU transmission 112 operates to wake the first station STA1 out of a sleep mode. Once woken up, the first station STA1 may send the UL transmission 114, which may include a PS-Poll frame, to the AP 102 to indicate that the first station STA1 is awake. In response to receiving the UL transmission 114, the AP 102 may transmit the DL transmission 116 which may include user date for the first station STA1.

In other embodiment, the first station STA1 may not send the UL transmission 114 in response to being woken up, but may instead use its main RF transceiver to listen for the DL transmission 116. The first station STA1 may then send the UL transmission 114 in response to the DL transmission 116.

The WU packet of the WU transmission 112 includes a Legacy 802.11 preamble transmitted in OFDM and includes an LP-WUR signal. The Legacy 802.11 preamble provides coexistence with legacy stations and with stations that are not in sleep mode. Using the Legacy Short Training Field (L-STF), Legacy Long Training Field (L-LTF), and Legacy Signal (L-SIG) field of the Legacy 802.11 Preamble, the stations can detect the beginning of WU packet and determine the length of it. The WU packet contains a receiver address which could be single, multiple, or broadcast address.

Each of the stations STA1 to STA3 and the AP 102 includes a processor and one or more transceiver circuits, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA4 and the AP 102 may be respectively implemented using hardware components, software components, or both.

The first AP 102 may be or include a WLAN router, a stand-alone Access Point, a WLAN bridge, a Light-Weight Access Point (LWAP) managed by a WLAN controller, and the like. In addition, a device such as a personal computer, tablet computer, or cellular phone may configured to be able to operate as the AP 102, such as when a cellular phone is configured to operate as a wireless "hot spot."

Each of the stations STA1 to STA3 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

FIG. 2A illustrates a schematic block diagram of a wireless device 200 according to an embodiment. The wireless or WLAN device 200 may be included in the AP 102 or any of the stations STA1 to STA4 in FIG. 1.

The WLAN device 200 may include a power control circuit 202 and first and second power domains 204 and 206. The power control circuit 202 may turn power on and off to the first power domain 204 and turn power on and off to the second power domain 206 in response to signals from one or more devices within the WLAN device 200.

In an embodiment, the power control circuit 202 may turn off the power to the first power domain 204 and turn on the power to the second power domain 206 when the WLAN device 200 is in a sleep mode. The power control circuit 202 may turn on the power to the first power domain 204 when a signal from a device in the second power domain 206 indicates that the WLAN device 200 should be woken up. The power control circuit 202 may turn off the power to the second power domain 206 in response to an indication that the WLAN device 200 is no longer in the sleep mode. The power control circuit 202 may turn on the power to the second power domain 206 in response to an indication that the WLAN device 200 is about to enter the sleep mode.

In an embodiment, the power control circuit 202 may place the first power domain 204 in a Doze state instead of turning off the power to the first power domain 204. In the Doze state, power control circuit 202 reduces a power supply voltage of the first power domain 204 to a standby voltage rather than turning the power off to the first power domain 204 in order to, for example, maintain an internal state of the circuits in the first power domain 204.

The first power domain 204 of the WLAN device 200 includes a baseband processor 210, a radio frequency (RF) transceiver 240, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The first power domain 204 may also include an application processor, a graphics processor, and the like.

The second power domain 206 of the WLAN device 200 includes a Low Power Wake-up Radio (LP-WUR) 208. The WLAN device 200 may also include an antenna unit 250 that is not in either of the first and second power domains 204 and 206.

FIG. 2B shows power states of the wireless device 200 according to an embodiment. In the illustrative embodiment, the wireless device 200 has four power states, but embodiments are not limited thereto.

In the SLEEP state, the first power domain 204 is turned off or placed in a Doze state and the second power domain 206 is turned on. In the SLEEP state, the LP-WUR 208 listens for a Wake Up (WU) packet addressed to the wireless device 200.

When the LP-WUR 208 receives a WU packet addressed to the wireless device 200, the LP-WUR 208 signals to the power control circuit 202 to wake up the wireless device 200. In response, the power control circuit 202 turns on the first power domain 204, placing the wireless device 200 in the WAKING UP state.

In an embodiment, the wireless device 200 has an AWAKE state controlled by a processor in the wireless device. When the wireless device 200 enters the AWAKE state, communications are performed through the RF transceiver 240, so there is no need to have the LP-WUR listening for WU packets, and the second power domain 206 may be turned off.

In an embodiment having the AWAKE state, the wireless device 200 has a PREPARING TO SLEEP state controlled by the processor in the wireless device. When the wireless device 200 is preparing to enter the SLEEP state, the second power domain 206 may be turned back on before the first power domain 204 is turned off, such as when, for example, a circuit in the first power domain 204 still has actions to perform to prepare for the SLEEP state after the second power domain 206 is turned on. When those actions are finished, the wireless device 200 may turn off the first power domain 204 and enter the SLEEP state.

In an embodiment without the AWAKE state, the second power domain 206 is never turned off.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2A, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
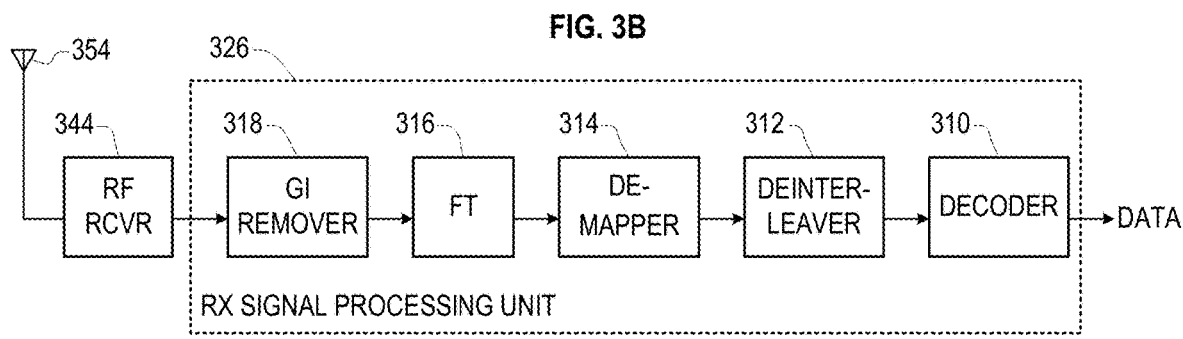
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2A, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
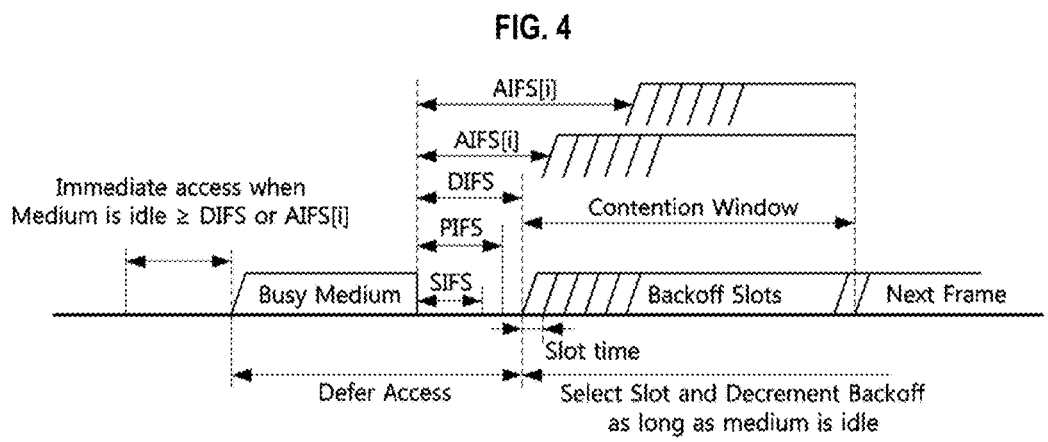
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
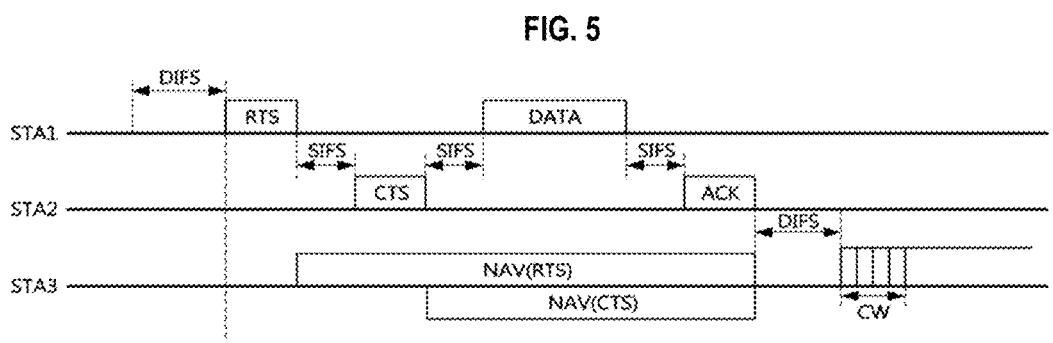
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-S end (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+ SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define fields denoted as Legacy Signal (L-SIG), Signal A (SIG-A), and Signal B (SIG-B) within which some necessary information about PHY Service Data Unit (PSDU) attributes are communicated. For example, a High Efficiency (HE) PHY entity may define an L-SIG field, an HE Signal A (HE-SIG-A) field, and an HE Signal B (HE-SIG-B) field.

In order to support long range and low power (LRLP) data transmissions, the transmitted signal carrying a WU packet should have a low peak to average power ratio (PAPR) or similar metric (e.g., a low Cubic Metric (CM)). Additionally, the LRLP data transmission should be backward compatible with existing IEEE Std 802.11 systems. Backward compatibility can be obtained by using legacy preamble as part of the LRLP data transmission.

Figure 6:
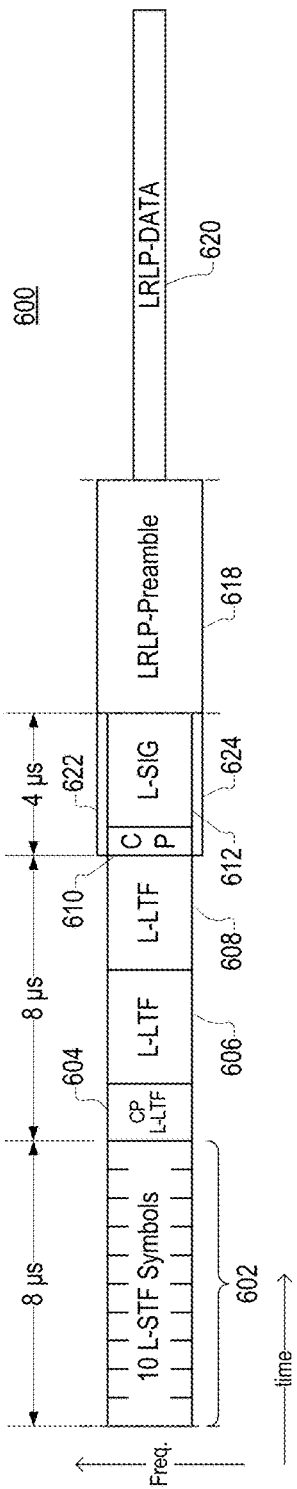
FIG. 6 shows a Long Rang Low Power (LRLP) data signal according to an embodiment.

FIG. 6 shows an LRLP data signal 600 according to an embodiment. The LRLP data signal 600 includes a legacy preamble. The LRLP data signal 600 also includes a LRLP preamble 618 and LRLP Data 620.

The Legacy preamble includes an L-STF 602, an L-LTF Cyclic Prefix (CP) 604, first and second L-LTF symbols 606 and 608, and an L-SIG field 612 including an L-SIG CP 610. The L-SIG field 612 may be transmitted using additional upper and lower tones 622 and 624 (not used in the preceding portions of legacy preamble) at the edge of the bandwidth. Since legacy devices do not expect or process the extra edge tones, the extra edge tones do not interfere with reception of the L-SIG field 612 by legacy devices.

In an embodiment, an LRLP data signal is distinguished from other 802.11 data signals, such as Non-HT, HT, VHT, or HE PPDUs, by transmitting a cyclically shifted repetition of the L-SIG field of the legacy preamble immediately after transmitting the L-SIG field.

The frequency bandwidth of the LRLP preamble 618 can be the same as the frequency bandwidth of the legacy preamble, or it can be narrower than the frequency bandwidth of the legacy preamble. In an embodiment, the frequency bandwidth of the LRLP preamble 618 can be narrower than the frequency bandwidth of the L-STF 602 or L-LTF 608 of the legacy preamble. In an embodiment, the frequency bandwidth of the LRLP preamble 618 can be the same as the frequency bandwidth of the L-STF 602 or L-LTF 608 of the legacy preamble. In an embodiment, the frequency bandwidth of the LRLP preamble 618 can be the same as the frequency bandwidth of the L-SIG 612 with the extra tones 622 and 624.

In an embodiment, the frequency bandwidth of the LRLP Data 620 can be narrower than the frequency bandwidth of the L-STF 602 or L-LTF of the legacy preamble. In an embodiment, the frequency bandwidth of the LRLP Data 620 can be the same as or narrower than the frequency bandwidth of the LRLP preamble 618.

Figure 7:
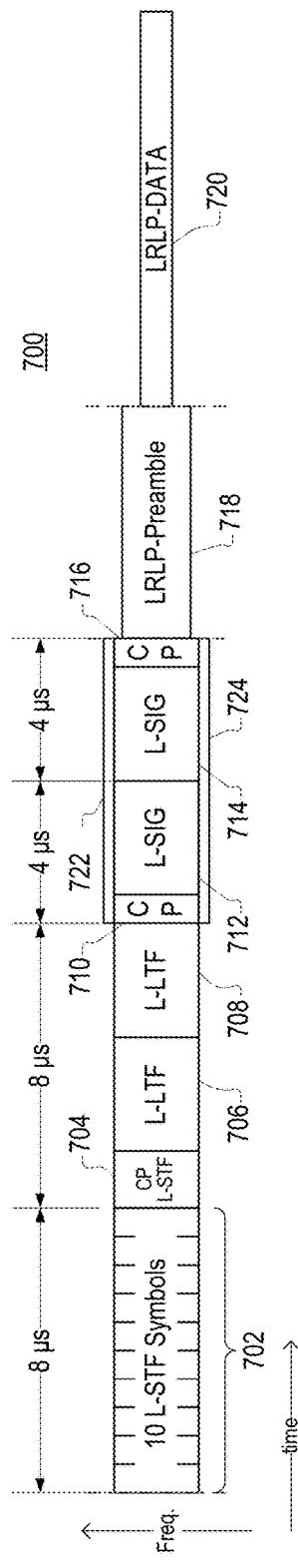
FIG. 7 shows an LRLP data signal according to another embodiment.

FIG. 7 illustrates an LRLP data signal 700 according to an embodiment. Features of FIG. 7 having correspondingly numbered features in FIG. 6 are similar to their respective features in FIG. 6. For example, the L-SIG field 712 of FIG. 7 is similar to the L-SIG field 612 of FIG. 6.

The LRLP data signal 700 can include a 20 MHz OFDM symbol. In an embodiment, the 20 MHz OFDM symbol can be a repeated cyclically-shifted L-SIG field 714 including a second L-SIG CP 716. Since the repeated cyclically-shifted L-SIG field 714 is a repeated cyclically-shifted version of the L-SIG field 712, the repeated cyclically-shifted L-SIG field 714 can have the same characteristics of the L-SIG field 712. That is, the tone spacing of the repeated cyclically-shifted L-SIG field 714 can be 312.5 kHz, because 312.5 kHz is used as the tone spacing of the L-SIG field 712. The repeated cyclically-shifted L-SIG field 714 can be modulated with BPSK, because BPSK is used for modulating the L-SIG field 712. The repeated cyclically-shifted L-SIG field 714 prevents legacy devices from mistaking the LRLP data signal 700 for an IEEE Std 802.11n packet.

As shown in FIG. 7, the second L-SIG CP 716 is transmitted at the end of the repeated cyclically-shifted L-SIG field 714, as opposed to at the beginning like the L-SIG CP 710 of the L-SIG field 712. The repeated cyclically-shifted L-SIG field 714 has a duration of 4 μs, and follows immediately after the L-SIG field 712.

In the embodiment of FIG. 7, the LRLP preamble 718 of the LRLP data signal 700 is transmitted without using the upper and lower extra tones 722 and 724.

Figure 8:
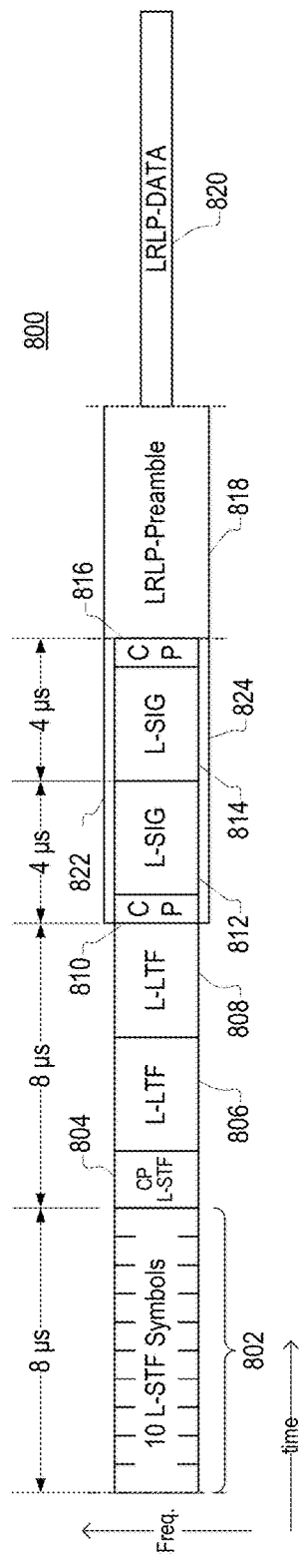
FIG. 8 shows an LRLP data signal according to another embodiment.

FIG. 8 illustrates an LRLP data signal 800 according to another embodiment. Features of FIG. 8 having correspondingly numbered features in FIG. 7 are similar to their respective features in FIG. 8. For example, the L-SIG field 812 of FIG. 8 is similar to the L-SIG field 712 of FIG. 7.

The LRLP data signal 800 of FIG. 8 differs from the LRLP data signal 700 of FIG. 7 is that the LRLP preamble 818 of the LRLP data signal 800 is transmitted using the upper and lower extra tones 822 and 824.

FIGS. 9A and 9B illustrates the difference between a repeated L-SIG field 932 and a repeated cyclically-shifted L-SIG field 914 according to an embodiment. FIG. 9A shows the repeated L-SIG field 932, and FIG. 9B shows the repeated cyclically-shifted L-SIG field 914.

The repeated L-SIG field 932 may be produced by transmitting a copy of the L-SIG field 912, the copy including the L-SIG CP 910 of the L-SIG field 912. In contrast, the cyclically-shifted L-SIG field 914 may be generated by transmitting a copy of the signal portion (exclusive of the L-SIG CP 910) of the L-SIG field 912, and then immediately transmitting a first portion (e.g., a first 0.8 μs) of the repeated cyclically-shifted L-SIG field 914 as the second L-SIG CP 916.

Accordingly, a time domain signal $x_n$ of the repeated L-SIG field 912 and the repeated L-SIG field 932 may be expressed as:

$$x_n = \frac{1}{\sqrt{N_{tone}N_{norm}}} \sum_{k=-N_{SR}}^{N_{SR}} X_k \cdot e^{j2\pi\Delta_f k(n-N_{GI})} \quad \text{Eq. 1}$$

and a time domain signal $\hat{x}_n$ of the repeated cyclically-shifted L-SIG field 914 may be expressed as:

$$\hat{x}_n = \frac{1}{\sqrt{N_{tone}N_{norm}}} \sum_{k=-N_{SR}}^{N_{SR}} X_k \cdot \boxed{e^{j2\pi\Delta_f kN_{shift}}} \cdot e^{j2\pi\Delta_f k(n-N_{GI})} \quad \text{Eq. 2}$$

wherein k is a subcarrier index, $N_{SR}$ is a highest subcarrier index, $X_k$ is frequency domain information of a subcarrier k, $\Delta_f$ is a subcarrier frequency spacing, $N_{shift}$ is the cyclic shift amount, $N_{GI}$ is a duration of the L-SIG CP 910, $N_{tone}$ is a number of subcarriers as a function of a bandwidth of the L-SIG field 912, and $N_{norm}$ is a normalizing factor. The difference between the equations is highlighted by a box in second equation.

FIG. 10 shows field information for the contents of an L-SIG field of a legacy preamble. The L-SIG field contains a rate field, a reserved (R) field, a length field, a parity check bit (P) field, and the BCC signal tail field. The BCC signal tail field is always set to all zeros. The parity bit is set to the parity of the entire L-SIG contents. For example, if number of 1's in the rate, reserved, and the length fields is even, the parity bit would be set to zero, and if the number of 1's in the rate, reserved, and the length fields is odd, the parity bit would be set to one.

Unlike the L-STF and L-LTF of the legacy preamble, which have each been designed to have a low PAPR, the L-SIG field has not been optimized to have a low PAPR. In order to further reduce the PAPR of the L-SIG (and in embodiments the repeated cyclically-shifted L-SIG), extra tones to the edge of the L-SIG signal can be filled with a predetermined sequence, that is determined by the content of the L-SIG signal. The contents of the extra tones may be determined according to the contents of the rate, reserved, and length field, the values of the extra tone is set.

FIG. 11 illustrates a process 1100 for adding extra tones to an L-SIG field 1102 according to an embodiment. The contents of the L-SIG field 1102 are mapped into the frequency domain by an encoding process 1104 and an interleaving process 1106.

The upper and lower extra tones 1112 and 1110 are mapped to the L-SIG in the frequency domain and not jointly encoded with the L-SIG contents. The upper and lower extra tones 1112 and 1110 are added to the output of the interleaving process 1106 at the upper and lower edges of the frequency band respectively, as shown in the figure.

The frequency domain tones are then mapped to the time domain by an inverse Fourier Transform (iFT) process 1108. The iFT process 1108 may use an inverse Fast Fourier Transform (iFFT).

Figure 12:
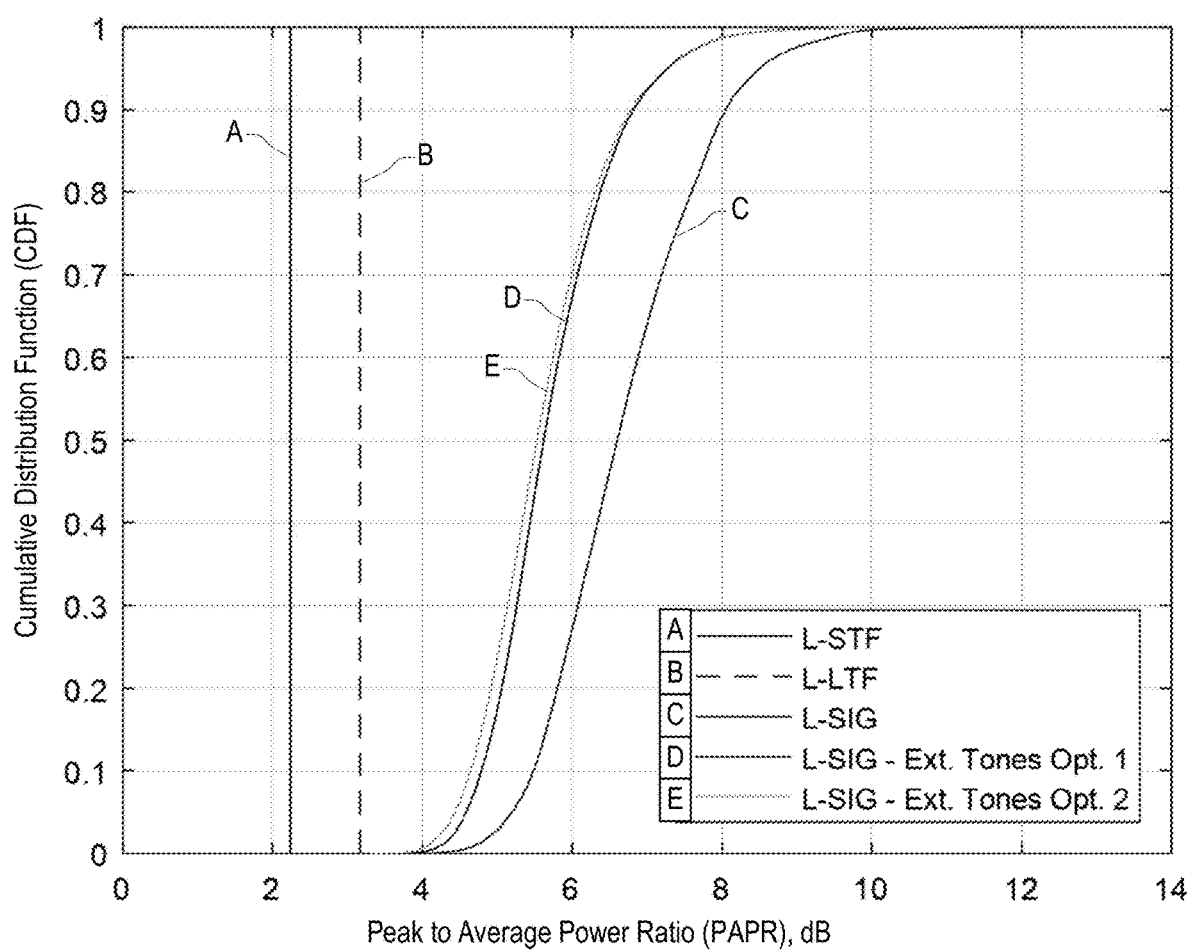
FIG. 12 illustrates improvement in a Peak to Average Power Ratio (PAPR) of an L-SIG field OFDM symbol achieved by the use of extra tones according to an embodiment.

FIG. 12 illustrates how the PAPR of the L-SIG OFDM symbol can be optimized by choosing the right values for the extra tones. Curve D, labeled "L-SIG—Ext. Tones Opt. 1," corresponds to the extra tones being filled with either {+1, or −1} values. Curve D, labeled "L-SIG—Ext. Tones Opt. 2," corresponds to the extra tones being filled with {0, +1, +j, −1, or −j} values.

FIGS. 13A through 13I include a Table 1 that shows values available to be used to configure the extra tones, the extra tones corresponding to subcarriers having indexes k=−28, −27, 27, and 28. Table 1 is presented in 9 parts. There are 625 options available, each of which is assigned an Option Number in Table 1. Embodiments select a pattern from Table 1 for use as the extra tone according to the contents of an L-SIG field, in order to reduce the PAPR of the L-SIG field.

FIGS. 14A through 14L include a Table 2 that shows selection, according to an embodiment, of a pattern from Table 1 (the Tone Option No. column) for use in the extra tones of an L-SIG field of a LRLP transmission, wherein the pattern is selected according to the contents (Rate, Reserved, and L-Length—note that the Parity bit is determined by these fields) of the L-SIG field. The contents of the L-SIG indicate the length of the entire data signal to non-intended station, and allow the non-intended stations to determine if the packet is intended for it. Table 2 is presented in 12 parts.

Embodiments use predetermined quantized data signal durations for LRLP signals. Examples of the quantized data signal durations are shown in PPDU length column of Table 2. To signal the data signal duration of the LRLP transmission n the L-SIG, embodiments use the Rate, Reserved, and Length field contents and the extra tone option shown in Table 2.

FIG. 15 includes a Table 3 showing Rate index to Rate bit mapping for the Rate field of an L-SIG field according to an embodiment.

Referring again to Table 2, to indicate in the L-SIG field that the LRLP transmission has a PPDU length of 40 us (which include the L-STF, L-LTF, and L-SIG durations), the rate is configure to 7, which corresponds to [0,0,1,1] as shown in FIG. 15, the reserved bit field is set to 0, the length field is set to 128, and extra tone option #167 is used. As shown in Table 1, the extra tone option #167 corresponds to use of {+1, −1, +1, +1} in the subcarriers k=−28, −27, +27, and +28, respectively. This results in a PAPR of 3.99 dB, which is relatively low.

The use of the encodings of Table 2 and Table 3 results in significant reduction in PAPR of the legacy preamble. This allows the device to maximize the transmit power and efficiency of the transmitted signal.

Figure 16:
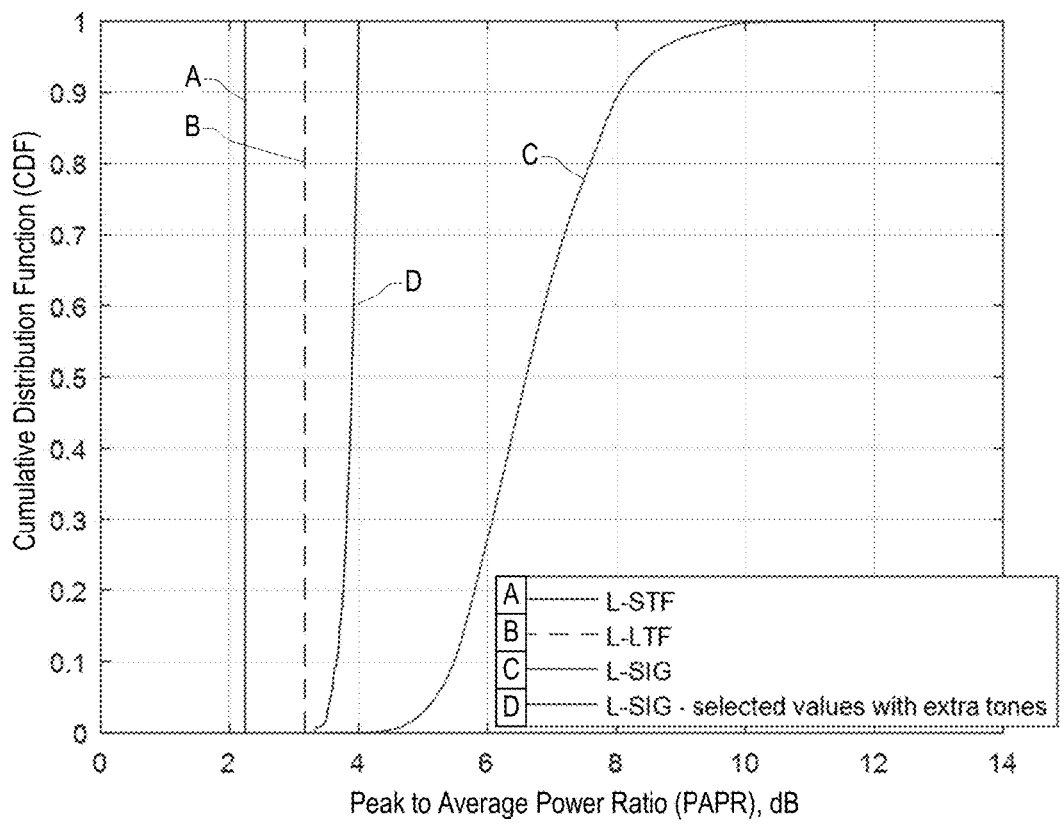
FIG. 16 illustrates improvement in a PAPR of an L-SIG field OFDM symbol achieved by the use of the extra tone patterns of Table 1 when selected according to Table 2, according to an embodiment.

FIG. 16 shows the resulting PAPR distribution for the L-SIG field both with (Curve D) and without (Curve C) the use of the extra tones according to Tables 1, 2, and 3.

An LRLP transmission can be used to transmit a Wake-Up (WU) packet to a dedicated Low Power Wake-Up Radio (LP-WUR), such as the LP-WUR 208 of the wireless device 200 of FIG. 2. The LP-WUR is a simplified radio that consumes very little power while operating in receive mode.

In order to facilitate the use of a simple design of the LP-WUR, the signals intended for reception by the LP-WUR may be based on on-off keying (OOK). This allows simple detectors, thereby reducing the power consumptions of the digital part of the LP-WUR. However, in order to keep a backwards compatibility with existing 802.11 devices, the signals intended for the LP-WUR are preceded with L-STF, L-LTF, and L-SIG field signals.

Figure 17:
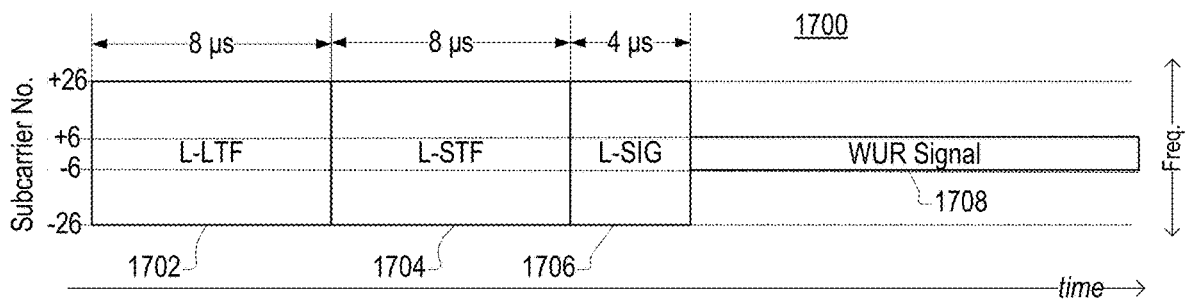
FIG. 17 illustrates a transmission including signals intended for a Low Power Wake-Up Radio (LP-WUR) according to an embodiment.

FIG. 17 illustrates a transmission 1700 including signals intended for a LP-WUR, according to an embodiment. The transmission 1700 includes an L-STF 1702, an L-LTF 1704, and an L-SIG field 1706 followed by a Wake-Up Radio (WUR) signal 1708 intended for a LP-WUR. In the example shown, the L-STF 1702, L-LTF 1704, and L-SIG field 1706 are transmitted using subcarriers −26 to 26 of a 20 MHz bandwidth, and the WUR signal 1708 is transmitted using subcarriers −6 to 6 of a 20 MHz bandwidth, but embodiments are not limited thereto.

Figure 18:
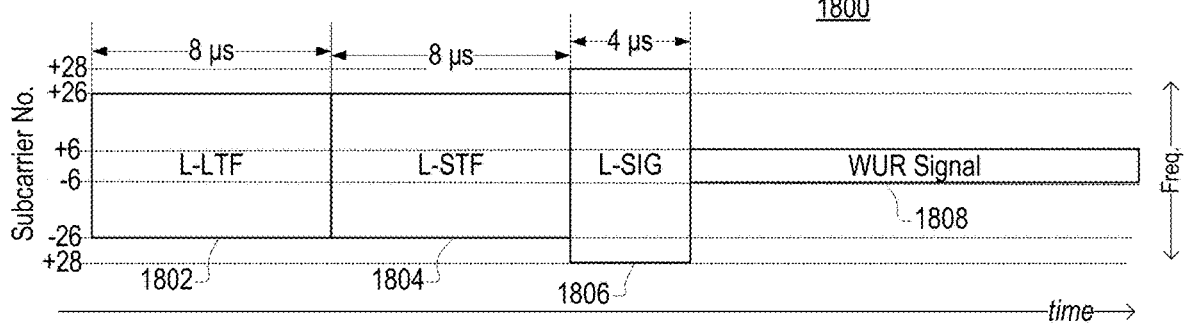
FIG. 18 illustrates a transmission including signals intended for a LP-WUR according to another embodiment.

FIG. 18 illustrates a transmission 1800 including signals intended for a LP-WUR, according to another embodiment. The transmission 1800 includes an L-STF 1802, an L-LTF 1804, and an L-SIG field 1806 followed by a WUR signal 1808 intended for a LP-WUR. In the example shown, the L-STF 1802 and L-LTF 1804 are transmitted using subcarriers −26 to 26 of a 20 MHz bandwidth, and the WUR signal 1808 is transmitted using subcarriers −6 to 6 of a 20 MHz bandwidth, but embodiments are not limited thereto.

Unlike the transmission 1700 of FIG. 17, the, and L-SIG field 1806 of the transmission 1800 is transmitted using subcarriers −26 to 26 of a 20 MHz bandwidth and additional tones on the edge of the 20 MHZ bandwidth (e.g., subcarrier indices k=−28, −27, +27, +28). The additional tones are used to reduce the PAPR of the L-SIG field 1806. In another embodiment, the L-LTF 1804 is also transmitted using the additional tones.

FIG. 19 includes a Table 4 showing a set of Rate and L-Length values for an L-SIG field that result in good PAPRs for a given PPDU length, according to an embodiment. Because a transmission intended for a LP-WUR has no data being transmitted at the rate indicated by the Rate field of the L-SIG, embodiments select the value of the Rate field in order to provide a good PAPR for the L-SIG field of the legacy portion of the transmission.

Figures 20, 21:
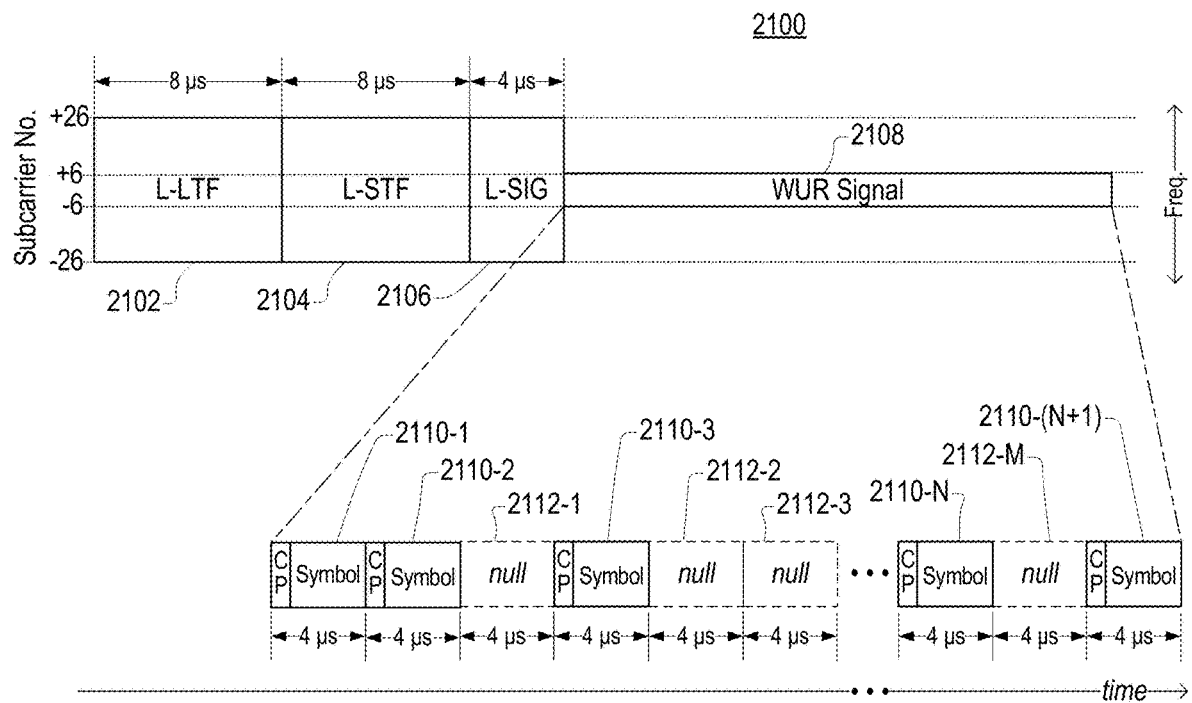
FIG. 20 includes a table showing Rate and L-Length values for an L-SIG field that result in good PAPRs for a given PPDU length according to another embodiment.
FIG. 21 illustrates transmission of a WUR signal in a WU packet according to an embodiment.

FIG. 20 includes a Table 5 showing a set of Rate and L-Length values for an L-SIG field that result in good PAPRs for a given PPDU length, according to another embodiment.

Unlike Table 2, an embodiment using Table 4 or Table 5 always sets the Reserved bit of the L-SIG field to zero (0). As a result, the PAPR values obtain in an embodiment according to Table 4 may be higher than PAPR values obtain in an embodiment according to Table 2.

FIG. 21 illustrates transmission of a WUR signal 2108 in a WU packet 2100 according to an embodiment. The WU packet 2100 includes an L-STF 2102, an L-LTF 2104, and an L-SIG field 2106 that all precede the WUR signal 2108.

The wake up radio payload signal is transmitted by on-off keying of entire OFDM symbols. For example, in an embodiment, a value of 1 can be represented by transmission of an OFDM symbol, and a value of 0 can be represented by lack of signal during the potential OFDM symbol duration, as shown in FIG. 21. In such an embodiment, each potential OFDM symbol can represent 1 bit of information, and respective durations of the resulting On-Off Keying (OOK) bits is 4 us.

Accordingly, the WUR signal 2108 includes a first transmitted OFDM symbol 2110-1 corresponding to a value of 1 for a first bit, a second transmitted OFDM symbol 2110-2 corresponding to a value of 1 for a second bit, no transmission for a first null period 2112-1 corresponding to a value of 0 for a third bit, a third transmitted OFDM symbol 2110-3 corresponding to a value of 1 for a fourth bit, no transmission for a second null period 2112-2 corresponding to a value of 0 for a fifth bit, no transmission for a third null period 2112-3 corresponding to a value of 0 for a sixth bit, an $N^{th}$ transmitted OFDM symbol 2110-N corresponding to a value of 1 for an $X^{th}$ bit, no transmission for an $M^{th}$ null period corresponding to a value of 0 for an $X+1^{th}$ bit, and an $N+1^{th}$ transmitted OFDM symbol 2110-(N+1) corresponding to a value of 1 for an $X+2^{th}$ bit, wherein X=N+M−1.

Each OFDM symbol can be generated using the OFDM symbol generator by having a predefined sequence that is mapped to a subset of the subcarriers in the frequency domain.

Figure 22:
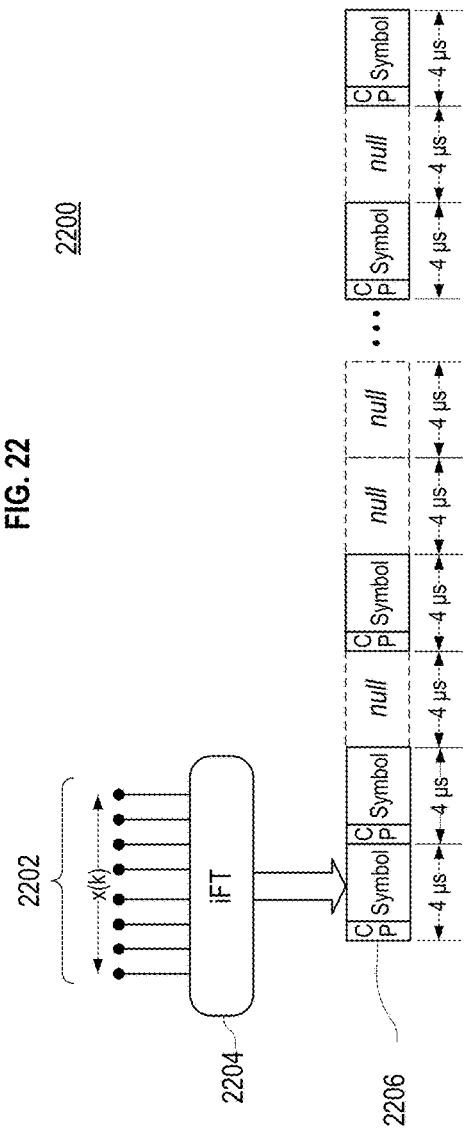
FIG. 22 illustrates a process of generating an OFDM symbol for use in On-Off keying (OOK) transmission according to an embodiment.

FIG. 22 illustrates a process 2200 of generating an OFDM symbol 2206 for use in OOK transmission according to an embodiment. A plurality of values x(k) are mapped to respective subcarriers k, where k has a range covering a subset 2202 of the available subcarriers, and the remaining subcarriers outside of the subset 2202 are given values of 0. In an embodiment, k ranges from −6 to 6.

The subcarriers are then converted to a time domain by an inverse Fourier Transform (iFT) process 2204 to create a corresponding time-domain OFDM symbol 2206.

Figure 23:
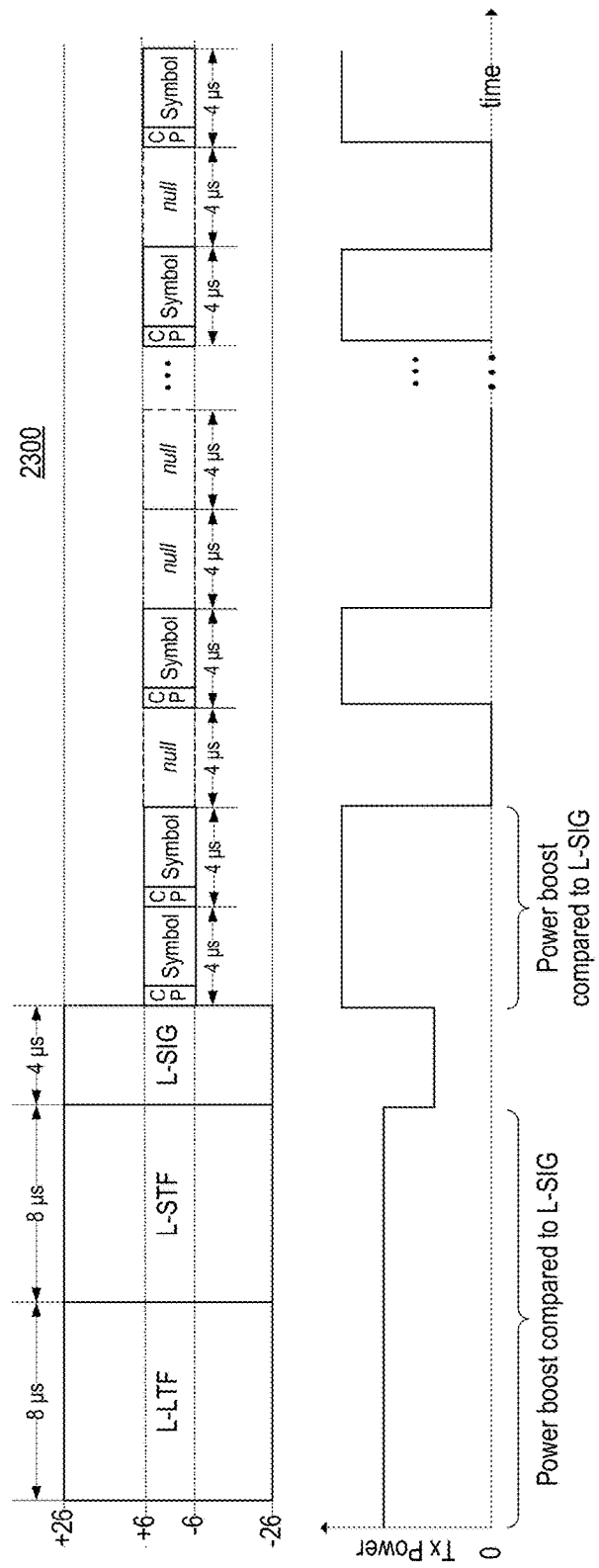
FIG. 23 illustrates power levels of the Wake-Up (WU) packet according to an embodiment.

FIG. 23 illustrates power levels of the WU packet 2300 according to an embodiment. As seen in the figure, different portions of the WU packet 2300 may be transmitted at different power levels.

The PAPR of each OFDM symbols of the WU packet 2300 may not be identical. Since L-SIG OFDM symbol is transmitted in BPSK, power boosting of L-STF and L-LTF OFDM symbol does not impact signal reception for legacy devices. Furthermore, wake up radios do not decode the legacy preamble portion of the WU packet (i.e., L-STF, L-LTF, and L-SIG fields), so the WUR signal portion can be power boosted differently compared to the legacy preamble portion.

FIGS. 24A and 24B include a Table 6 showing PAPR values for patterns that may be used to generate the OFDM symbols 2110-1 to 2110-(N+1) of WUR signal 2108 of the WU packet 2100 of FIG. 21, according to an embodiment. The embodiment reduces the PAPR of the OFDM symbols 2110-1 to 2110-(N+1) by the selection of the values used to generate them. Optimized set of sequences with length of 13, where the sequence is mapped from the −6 to +6 subcarriers of the OFDM symbol (including 0), is shown in Table 6.

In an embodiment, the sequences listed in Table 6 are used as base sequences for generating OOK signals for LP-WURs. The first 8 sequences provide excellent PAPR results and therefore, make it possible to power boost the WUR OFDM symbols (e.g., OFDM symbols 2210-1 et seq. of WUR signal 2108) relative to the the L-SIG field or L-STF/L-LTF OFDM symbols (e.g., the symbols used to trasnmit the L-STF 2102, L-LTF 2104, and L-SIG field 2106 of WUR signal 2108).

The first four sequences and the next four sequences of the table a the same sequence (here, the first and fifth sequences) that has been either mirror flipped, negated, or both. The PAPR property does not change when sequences are flipped or negated as a whole.

In another embodiment, a base sequence for OOK signal generation is a Zadoff-Chu (ZC) sequence. Odd length ZC sequence can be mapped to subcarriers −Ns to +Ns. However, in order to avoid DC subcarrier signal transmission, which may not be possible for LP-WURs utilizing direct conversion methods, the signal at 0 (i.e. DC subcarrier) is nulled out. The nulling of the DC tone distorts the time domain constant envelop property of the ZC sequence, however, the time domain signal still exhibits pretty good PAPR properties.

The sequence equation for the ZC sequence can be expressed as $$x_u(k)=\exp(-j\pi \cdot u \cdot k \cdot (k+1)/N_{ZC}), \ -\lfloor N_{ZC}/2 \rfloor \leq k < \lfloor N_{ZC}/2 \rfloor \quad \text{Eq. 3}$$

where Nzc is the length of the sequence, u is the root index between 1 and (Nzc−1) that is a prime with Nzc, and k is the subcarrier index. For example, an OOK signal that spans 4 MHz can use the following parameters in an OFDM symbol with subcarrier spacing of 312.5 kHz:

$$N_{ZC}=13, k=[-6, -5, -4, \ldots, 4, 5, 6]$$

FIG. 25 includes a Table 7 of root indexes for ZC sequences of length of 13 (which is a prime number) that provides good PAPR. For example, u=6 provides a PAPR of 3.64 dB which is comparable to the PAPR of the L-LTF sequence.

The LP-WUR may experience a large carrier frequency error during carrier frequency synthesis. In embodiments, may use OOK symbols having 3 DC tones (i.e. k=−1, 0, +1) for DC and subcarriers −6 to −2, and +2, to +6 (or −7 to −2, +2 to +7) may use mapping sequences that result in low PAPR.

FIG. 26 includes a Table 8 that shows sequences having DC tones that result in low PAPR and that are therefore good candidates for OOK symbols using a total of 13 tones, according to an embodiment.

FIG. 27 includes a Table 9 that shows sequences having DC tones that result in low PAPR and that are therefore good candidates for OOK symbols using a total of 15 tones, according to an embodiment.

Similar to the sequence shown in Table 6, the sequences listed can be mapped to a subset of subcarriers of an OFDM symbol, and the OFDM symbol and its cyclic prefix represent a single bit of an OOK signal.

Embodiments may choose one of the proposed frequency domain sequences listed in Table 6, Equation 3, Table 8, or Table 9 for defining a single bit of an OOK signal. In other embodiments, such as an embodiment using Manchester encoding, the proposed frequency domain sequences listed in Table 6, Equation 3, Table 8, or Table 9 may be used for an OFDM symbol that is a portion (e.g., a first or second half when using Manchester encoding) of a single bit of an OOK signal.

Although it is possible to use the same sequence in each OFDM symbol of the wake up radio signal packet, there may be advantages to dc offset tracking and carrier offset compensation if the sequences of the each OFDM symbol within the wake up radio signal packet is changed. One way to perform this is to multiply the values used to generate the OFDM symbols by values from a pseudo random sequence, where each value of the sequence is multiplied by an entire OFDM symbol.

FIG. 28A illustrates a process 2800A for varying OFDM symbols used for OOK transmission according to an embodiment. The process 2800A multiplies the values used to generate the OFDM symbols by values from a pseudo-random number sequence to vary the values.

In the process 2800A, each successive value $P_0$, $P_1$, $P_2$, ... of the pseudo-random sequence is used to generate successive transmitted OFDM symbols. Accordingly, in the example shown, a first value $P_0$ is used to generate the first transmitted OFDM symbol 2802, a second value $P_1$ is used to generate the second transmitted OFDM symbol 2804, a third value $P_3$ is used to generate the third transmitted OFDM symbol 2806, an $N^{th}$ value $P_N$ is used to generate the $N^{th}$ transmitted OFDM symbol 2808, and an $(N+1)^{th}$ value $P_{N+1}$ is used to generate the $(N+1)^{th}$ transmitted OFDM symbol 2810.

FIG. 28B illustrates a process 2800B for varying OFDM symbols used for OOK transmission according to another embodiment. The process 2800B multiplies the values used to generate the OFDM symbols by values from a pseudo-random number sequence to vary the values.

In the process 2800B, successive values $P_0, P_1, P_2, \ldots$ of the pseudo-random sequence is assigned to respective successive slots for transmissions of respective OFDM symbols. If an OFDM symbol is transmitted in the slot, the corresponding value from the sequence is used to generate the OFDM symbol. If no OFDM symbol is transmitted in the slot, the corresponding value from the sequence is not used.

Accordingly, in the example shown, a first value $P_0$ is used to generate the first transmitted OFDM symbol 2802, a second value $P_1$ is used to generate the second transmitted OFDM symbol 2804, a third value $P_2$ corresponds to a slot wherein an OFDM symbol is not transmitted and is therefore not used, a fourth value $P_3$ is used to generate the third transmitted OFDM symbol 2806, fifth and sixth values $P_4$ and $P_5$ corresponds to respective slots wherein OFDM symbols are not transmitted and are therefore not used, an $M^{th}$ value $P_M$ is used to generate the $N^{th}$ transmitted OFDM symbol 2808, an $(M+1)^{th}$ value $P_{M+1}$ corresponds to a slot wherein an OFDM symbol is not transmitted and is therefore not used, and an $(M+2)^{th}$ value $P_{M+2}$ is used to generate the $(N+1)^{th}$ transmitted OFDM symbol 2810.

As shown in FIGS. 28A and 28B, a difference between the process 2800A and the process 2800B is whether the pseudo random sequence values are consecutively allocated only to transmitted OFDM symbols of the wake up radio signal packet or the pseudo random sequence values are consecutively allocated even non-transmitted OFDM symbols of the wake up radio signal packet, respectively.

In some cases, a long period in which no signals are transmitted can cause the receiver to lose synchronization with a carrier of the signal.

One technique for preventing this is bit padding after N consecutive bits having a same value. Another technique for preventing this is Manchester encoding. A third technique for preventing this is N-to-M coding.

In bit padding, the total length of the information sequence is changed depending on how many N consecutives bits exist in the information. For example, bit 1 can be inserted after every instance of 3 consecutive 0's. Accordingly, if a bit sequence of [1 0 0 0 0 1 0 0 1 1 0 0 0 0 0 0 1 1] is to be transmitted, it would be transmitted as [1 0 0 0 1 0 1 0 0 1 1 0 0 0 1 0 0 0 1 1 1], wherein ones have been inserted after every instance of 3 consecutive 0's.

FIG. 29 illustrates Manchester encoding of an OOK transmission according to an embodiment. In Manchester encoding, a sequence of two bits is transmitted for every bit of data. A transmitted bit sequence of [0,1] represents a data bit having a value of 0 and a transmitted bit sequence of [1,0] represents a data bit having a value of 1 or vice versa.

Manchester encoding uses consecutive pairs of OFDM symbol transmission slots for each transmitted bit, wherein an OFDM symbol is transmitted in each pair. Thus, a first data bit having a value of 1 is communicated in a first slot pair 2920 by transmitting a first OFDM symbol 2902 in the first slot of the first slot pair 2920 and not transmitting an OFDM symbol in the second slot of the first slot pair 2920. A second data bit having a value of 1 is communicated in a second slot pair 2922 by transmitting a second OFDM symbol 2904 in the first slot of the second slot pair 2922 and not transmitting an OFDM symbol in the second slot of the second slot pair 2922.

A third data bit having a value of 0 is communicated in a third slot pair 2924 by not transmitting an OFDM symbol in the first slot of the third slot pair 2924 and transmitting a third OFDM symbol 2906 in the second slot of the third slot pair 2924.

A fourth data bit having a value of 1 is communicated in a fourth slot pair 2926 by transmitting a fourth OFDM symbol 2908 in the first slot of the fourth slot pair 2926 and not transmitting an OFDM symbol in the second slot of the fourth slot pair 2926.

A fifth data bit having a value of 0 is communicated in a fifth slot pair 2928 by not transmitting an OFDM symbol in the first slot of the fifth slot pair 2928 and transmitting a fifth OFDM symbol 2910 in the second slot of the fifth slot pair 2928. A sixth data bit having a value of 0 is communicated in a sixth slot pair 2932 by not transmitting an OFDM symbol in the first slot of the sixth slot pair 2932 and transmitting a sixth OFDM symbol 2912 in the second slot of the sixth slot pair 2932.

A benefit of Manchester encoding is that the there is no more than two consecutive slots wherein a zero powered transmission occurs in the signal packet, and receiver may able to retrieve the OOK signal clock from the transmission signal itself, rather than maintaining an internal clock source.

Manchester coding may be considered one form of N-to-M bit encoding, where M is larger than N bits. The N-to-M bit encoding process can be done such that coded bits do not have all zeros. Use of N-to-M bit encoding would ensure that long consecutive set of zeros are not transmitted for WUR signals. Illustrative examples of N-to-M bit encoding are shown in FIGS. 30-33.

Figures 30, 31, 32, 33, 34:
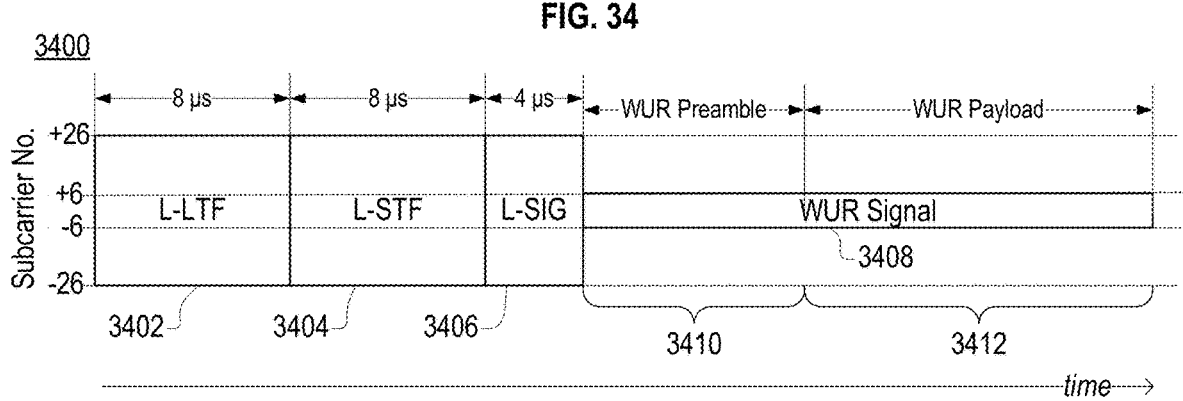
FIG. 30 includes a table showing illustrative 2-to-3 bit encodings according to an embodiment.
FIG. 31 includes a table showing illustrative 3-to-4 bit encodings according to an embodiment.
FIG. 32 includes a table showing illustrative 3-to-4 bit encodings according to another embodiment.
FIG. 33 includes a table showing illustrative 4-to-5 bit encodings according to an embodiment.
FIG. 34 illustrate an LRLP transmission for communicating a WU packet according to an embodiment.

FIG. 30 includes a Table 10 showing an illustrative 2-to-3 bit encoding of input bits into output bits according to an embodiment.

FIG. 31 includes a Table 11 showing an illustrative 3-to-4 bit encoding of input bits into output bits according to an embodiment.

FIG. 32 includes a Table 12 showing an illustrative a 3-to-4 bit encoding of input bits into output bits according to another embodiment.

FIG. 33 includes a Table 13 showing an illustrative 4-to-5 bit encoding of input bits into output bits according to an embodiment.

The bit mapping between input and output bits of the example can be shuffled to maximize detection performance (e.g. input 0 0 from Table 10 can be mapped to 111, and so on).

FIG. 34 illustrate a LRLP transmission 3400 for communicating a WU packet according to an embodiment. The LRLP transmission 3400 includes a legacy preamble including an L-STF 3402, an L-LTF 3404, and an L-SIG field 3406. The LRLP transmission 3400 further includes a WUR signal portion 3408 that includes a WUR preamble 3410 and a WUR payload 3412.

In an embodiment, the bit padding, Manchester encoding, or N-to-M coding described with respect to FIGS. 29 to 33 may be used to encode the WUR preamble 3410 and not used to encode the WUR payload 3412.

In another embodiment, one of bit padding, Manchester encoding, and N-to-M coding is used to encode the WUR preamble 3410 and a different one of padding, Manchester encoding, and N-to-M coding (including N-to-M coding using different values of N and M) is used to encode the WUR payload 3412.

For example, an embodiment may use Manchester encoding to encode the WUR preamble 3410, so that no more than 8 us of zero power duration would exist in the WUR preamble 3410, and 3-to-4 coding to encode the WUR payload 3412. This results in robust reception of the WUR preamble 3410 and decreased coding overhead in the WUR payload 3412 relative to the WUR preamble 3410.

Embodiments operate to distinguish a Long Range Low Power (LRLP) preamble from a legacy preamble in a Wireless Local Area Network (WLAN).

Embodiments operate to improve the Peak to Average Power Ratio (PAPR) of transmissions that include Wake-Up (WU) packets in a WLAN. Embodiments may improve the PAPR by one or more of selecting the contents of a Legacy Signal (L-SIG) field of the WU packet so as to reduce the PAPR, transmitting with the L-SIG field a plurality of extra tones selected according to the contents of the L-SIG field, and selecting the contents of OFDM symbols used to perform On-Off Keying (OOK) in the WU packet so as to reduce the PAPR.

Embodiments operate to simplify a Low-Power Wake-Up Radio (LP-WUR) by preventing long periods on no transmission during OOK transmissions in a WU packet.

The solutions provided herein have been described with reference to a wireless LAN system; however, it should be understood that these solutions are also applicable to other network environments, such as cellular telecommunication networks, wired networks, etc.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a wireless device, the method comprising:
generating a Legacy preamble including a Legacy Short Training Field (L-STF), a Legacy Long Training Field (L-LTF) and a Legacy Signal (L-SIG) field;
generating a 20 MHz Orthogonal Frequency Division Multiplexing (OFDM) symbol having a duration of 4 µs;
generating a Wake-Up (WU) signal portion having a frequency bandwidth that is narrower than a frequency bandwidth of the Legacy preamble; and
transmitting a frame, including:
transmitting the Legacy preamble,
transmitting the 20 MHz OFDM symbol immediately after transmitting the Legacy preamble, and
transmitting the WU signal portion immediately after transmitting the 20 MHz OFDM symbol.

2. The method of claim 1, wherein the 20 MHz OFDM symbol is modulated with Binary Phase Shift Keying (BPSK).

3. The method of claim 2, wherein the 20 MHz OFDM symbol has a tone spacing of 312.5 kHz.

4. The method of claim 1, wherein generating the WU signal portion comprises:
generating WU signals, and
encoding a plurality of bits of the WU signals into a plurality of encoded bits to prevent long periods of zero transmission power during the transmission of the WU signal portion.

5. The method of claim 4, wherein transmitting the WU signal portion comprises:
transmitting the plurality of encoded bits using On-Off Keying (OOK) as the WU data portion after transmitting the 20 MHz OFDM symbol.

6. The method of claim 5, wherein encoding the plurality of bits of the WU signal includes Manchester encoding the plurality of bits to produce the plurality of encoded bits.

7. The method of claim 5, wherein a duration of the WU data portion is 4 µs.

8. A wireless device comprising:
a transmitter circuit, wherein the wireless device is to:
generate a Legacy preamble including a Legacy Short Training Field (L-STF), a Legacy Long Training Field (L-LTF) and a Legacy Signal (L-SIG) field;
generate a 20 MHz Orthogonal Frequency Division Multiplexing (OFDM) symbol having a duration of 4 µs;
generate a Wake-Up (WU) signal portion having a frequency bandwidth that is narrower than a frequency bandwidth of the Legacy preamble; and
transmit a frame, including:
transmitting the Legacy preamble,
transmitting the 20 MHz OFDM symbol immediately after transmitting the Legacy preamble, and
transmitting the WU signal portion immediately after transmitting the 20 MHz OFDM symbol.

9. The wireless device of claim 8, wherein the 20 MHz OFDM symbol is modulated with Binary Phase Shift Keying (BPSK).

10. The wireless device of claim 9, wherein the 20 MHz OFDM symbol has a tone spacing of 312.5 kHz.

11. The wireless device of claim 8, wherein generating the WU signal portion comprises:

generating WU signals, and encoding a plurality of bits of the WU signals into a plurality of encoded bits to prevent long periods of zero transmission power during the transmission of the WU signal portion.

12. The wireless device of claim 11, wherein transmitting the WU signal portion comprises:

transmitting the plurality of encoded bits using On-Off Keying (OOK) as the WU data portion after transmitting the 20 MHz OFDM symbol.

13. The wireless device of claim 12, wherein encoding the plurality of bits of the WU signal includes Manchester encoding the plurality of bits to produce the plurality of encoded bits.

14. The wireless device of claim 12, wherein a duration of the WU data portion is 4 µs.

15. A non-transitory machine-readable storage medium having instructions that when executed by a processor of a wireless device cause the wireless device to:

generate a Legacy preamble including a Legacy Short Training Field (L-STF), a Legacy Long Training Field (L-LTF) and a Legacy Signal (L-SIG) field;

generate a 20 MHz Orthogonal Frequency Division Multiplexing (OFDM) symbol having a duration of 4 µs;

generate a Wake-Up (WU) signal portion having a frequency bandwidth that is narrower than a frequency bandwidth of the Legacy preamble; and transmit a frame, including:

transmitting the Legacy preamble, transmitting the 20 MHz OFDM symbol immediately after transmitting the Legacy preamble, and transmitting the WU signal portion immediately after transmitting the 20 MHz OFDM symbol.

16. The non-transitory machine-readable storage medium of claim 15, wherein the 20 MHz OFDM symbol is modulated with Binary Phase Shift Keying (BPSK).

17. The non-transitory machine-readable storage medium of claim 16, wherein the 20 MHz OFDM symbol has a tone spacing of 312.5 kHz.

18. The non-transitory machine-readable storage medium of claim 15, wherein generating the WU signal portion comprises:

generating WU signals, and encoding a plurality of bits of the WU signals into a plurality of encoded bits to prevent long periods of zero transmission power during the transmission of the WU signal portion, wherein transmitting the WU signal portion comprises:

transmitting the plurality of encoded bits using On-Off Keying (OOK) as the WU data portion after transmitting the 20 MHz OFDM symbol.

19. The non-transitory machine-readable storage medium of claim 18, wherein encoding the plurality of bits of the WU signal includes Manchester encoding the plurality of bits to produce the plurality of encoded bits.

20. The non-transitory machine-readable storage medium of claim 18, wherein a duration of the WU data portion is 4 µs.

* * * * *